United States Patent
Rockefeller et al.

(10) Patent No.: US 10,922,748 B1
(45) Date of Patent: Feb. 16, 2021

(54) USER INTERFACE AND SYSTEM FOR USING A NON-PAYMENT DEPENDENT NOTE RETAIL INVESTOR SECURITIES STRUCTURE TO CONDUCT INVESTOR-DIRECTED OR AFFINITY-BASED ONLINE MARKETPLACE LENDING

(71) Applicants: Mark L. Rockefeller, Reston, VA (US);
Michael M. Konson, Oakton, VA (US);
Hayley E. Chang, Reston, VA (US);
Madhur Grover, Vienna, VA (US)

(72) Inventors: Mark L. Rockefeller, Reston, VA (US);
Michael M. Konson, Oakton, VA (US);
Hayley E. Chang, Reston, VA (US);
Madhur Grover, Vienna, VA (US)

(73) Assignee: StreetShares, Inc., Reston, VA (US)

( * ) Notice: Subject to any disclaimer, the term of this patent is extended or adjusted under 35 U.S.C. 154(b) by 712 days.

(21) Appl. No.: 15/369,096

(22) Filed: Dec. 5, 2016

Related U.S. Application Data

(60) Provisional application No. 62/296,964, filed on Feb. 18, 2016, provisional application No. 62/263,331, filed on Dec. 4, 2015.

(51) Int. Cl.
*G06Q 30/00* (2012.01)
*G06Q 30/08* (2012.01)
*G06Q 30/06* (2012.01)

(52) U.S. Cl.
CPC ......... *G06Q 30/08* (2013.01); *G06Q 30/0601* (2013.01)

(58) Field of Classification Search
CPC ............................ G06Q 30/08; G06Q 30/0601
See application file for complete search history.

(56) References Cited

U.S. PATENT DOCUMENTS 7,437,323 B1 * 10/2008 Valkov .................. G06Q 40/04
705/36 R
2002/0138410 A1 * 9/2002 Siska ..................... G06Q 40/02
705/38

(Continued)

OTHER PUBLICATIONS

Chang, Shao-Chi, et al. "Investment opportunities, free cash flow, and stock valuation effects of secured debt offerings." Review of Quantitative Finance and Accounting 28.2 (2007): 123-145. (Year: 2007).*

*Primary Examiner* — Christopher B Seibert
(74) *Attorney, Agent, or Firm* — Aldo Noto; Davidson Berquist; Jackson & Gowdey LLP

(57) ABSTRACT

A user interface and system for using a non-payment dependent note retail investor security structure and payment dependent note structures to conduct investor-directed or affinity-based online marketplace lending are described. Some of the present inventions are directed to systems and methods for investor-directed online lending. Some inventions are directed to digital on-line peer-to-peer lending. Some inventions are related to affinity models in online lending and peer-to-peer lending. Some embodiments are related to auto investment and auction or funding period and bidding on all or portions of available notes.

Some of the embodiments relate to using a Non-Payment Dependent Note (NPDN) securities structure in online lending. Some embodiments combine on-line affinity lending systems and methods with NPDN lending systems and methods. User interfaces are described for each.

14 Claims, 31 Drawing Sheets

(56) References Cited

U.S. PATENT DOCUMENTS

| | | | | |
|---|---|---|---|---|
| 2006/0106675 | A1* | 5/2006 | Cohen | G06Q 30/0601 |
| | | | | 705/26.1 |
| 2007/0061260 | A1 | 3/2007 | deGroeve | G06Q 40/12 |
| | | | | 705/44 |
| 2007/0233507 | A1* | 10/2007 | Publicover | G06Q 10/0832 |
| | | | | 705/332 |
| 2011/0099037 | A1* | 4/2011 | Levin | G06Q 10/02 |
| | | | | 705/5 |
| 2011/0313820 | A1* | 12/2011 | Biewald | G06Q 10/06311 |
| | | | | 705/7.42 |
| 2012/0179549 | A1* | 7/2012 | Sigmund | G06Q 30/0261 |
| | | | | 705/14.58 |
| 2012/0284143 | A1* | 11/2012 | Hunter | G06Q 30/0601 |
| | | | | 705/26.4 |
| 2013/0246301 | A1* | 9/2013 | Radhakrishnan | G06Q 30/0282 |
| | | | | 705/347 |
| 2015/0178677 | A1* | 6/2015 | Strand | G06Q 10/0836 |
| | | | | 705/28 |

* cited by examiner (CONT. 1)

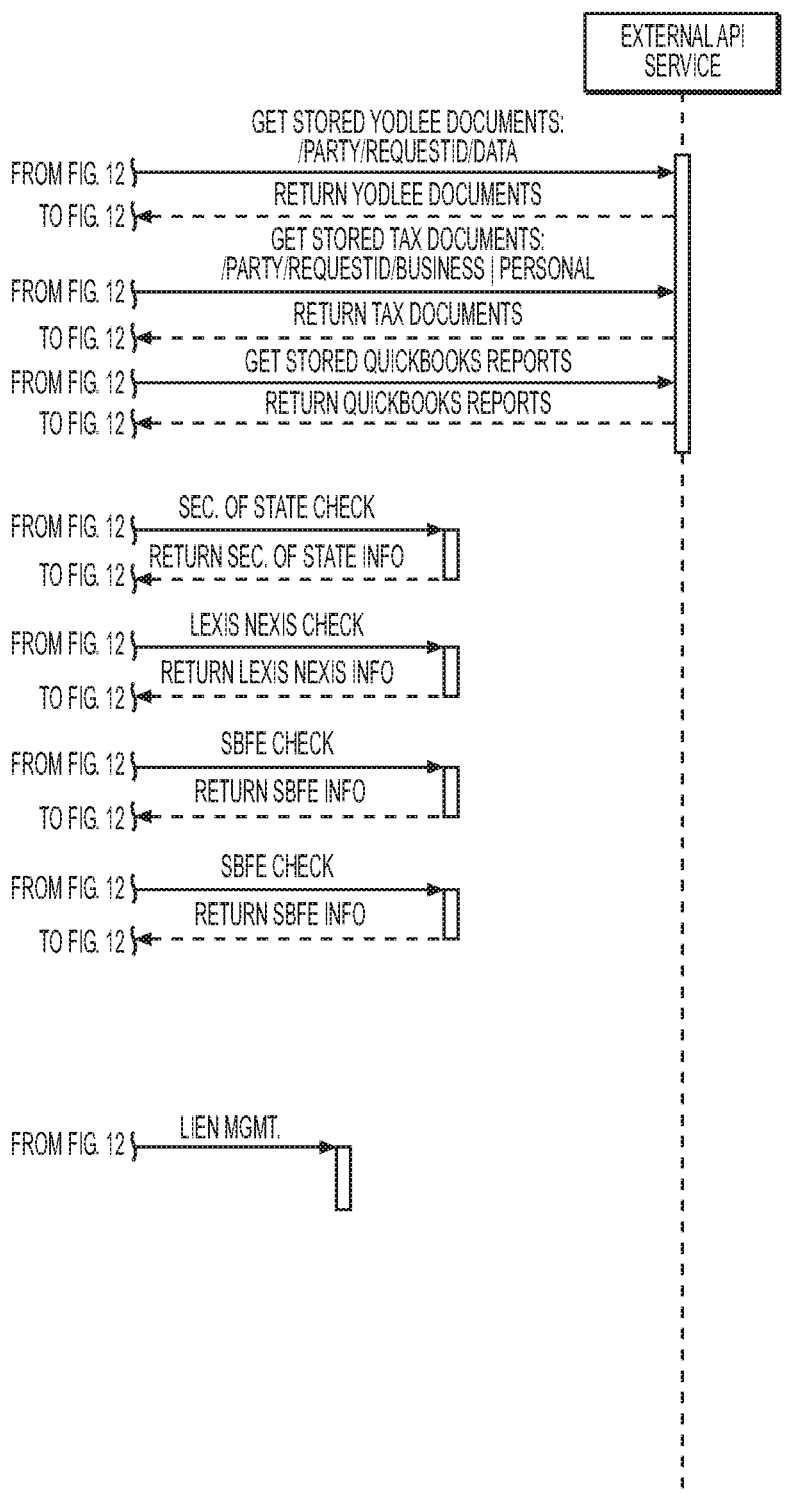
FIG. 12 (CONT. 1)

(CONT. 1)

BUSINESS LOAN REQUEST

STEP 1
QUALIFY NOW

STEP 2
SUBMIT

STEP 3
CONFIRM (INCOMPLETE)

FILL IN YOUR INFO AND INSTANTLY SEE IF YOU QUALIFY

SEE IF YOU QUALIFY - JUST TELL US A LITTLE BIT ABOUT YOURSELF YOU'LL RECEIVE A DECISION IN SECONDS.

FUNDING INFORMATION

LOAN AMOUNT REQUESTED (MAX $100K)

$2K — $25K — $50K — $75K — $100K    $100,000

REPAYMENT TERM (MONTHS)

3 — 6 — 12 — 18 — 24 — 36    36 MONTHS

HELPFUL TIPS
- QUESTIONS? CALL US AT 1-800-560-1435
- SEEING IF YOU QUALIFY WILL NOT AFFECT YOUR PERSONAL CREDIT SCORE
- CURRENTLY APPLY FOR UP TO $100,000
- REPAY YOUR LOAN EARLY WITHOUT PENALTY
- REQUEST LOAN AMOUNT SHOULD NOT EXCEED 20% OF ANNUAL BUSINESS REVENUE
- LONGER TERM LOANS ARE GENERALLY PROVIDED TO MORE ESTABLISHED BUSINESSES

TIPS ARE SPECIFIC TO EACH SECTION OF ONBOARDING, BASED ON FEEDBACK FROM BORROWERS AND SALES

*FIG. 15*

③ BORROWER INFORMATION

FIRST NAME: JASON
LAST NAME: MADINA
EMAIL: JASONMADINA@ME.COM

HELPFUL TIPS
- SEEING IF YOU QUALIFY WILL NOT AFFECT YOUR PERSONAL CREDIT SCORE
- HOUSEHOLD INCOME IS TOTAL INCOME OF YOU AND YOUR SPOUSE
- QUESTIONS? CALL US AT 1-800-560-1435

HOME ADDRESS
1985                                             X
◉ 1985 ISAAC NEWTON SQUARE WEST, RESTON, VA, UNITED STATES
◉ 1985 VILLARIDGE DRIVE, RESTON, VA, UNITED STATES
◉ 1985 LAKEPORT WAY, RESTON, VA, UNITED STATES
◉ 1985 LOGAN MANOR DRIVE, RESTON, VA, UNITED STATES

GOOGLE PLACES EXTERNAL API ALLOWS BORROWERS TO SEARCH FOR THEIR HOME ADDRESS AND AUTO-POPULATE THE REQUIRED FIELDS

HOME ADDRESS
1985 ISAAC NEWTON SQUARE WEST, RESTON, VA, UNITED STATES
1985 ISAAC NEWTON SQUARE WEST
RESTON, VA 20190        ✓ WE GOT IT

HOUSEHOLD INCOME
$100,000
$0K $20K $40K $60K $80K $100K $120K $140K $160K $180K $200K $300K $400K $500K+

% OWNERSHIP
25% - 49%
0% - 24%    25% - 49%    50% - 99%    100%

HOW WOULD YOU RATE YOUR PERSONAL CREDIT?
300         520-640                    850
NEEDS WORK   BUILDING   FAIR   GOOD   EXCELLENT

☑ I HAVE READ AND AGREE TO THE SECRETSHARES CREDIT PROFILE AUTHORITARIAN AND STREETSHARES BORROWER MEMBERSHIP
🖨 PRINT AGREEMENTS

QUALIFY NOW
THIS WILL NOT AFFECT YOUR PERSONAL CREDIT SCORE.

Norton by Symantec    🔒 ALL OF YOUR DATA IS ENCRYPTED AND CERTIFIED-SECURE    BBB ACCREDITED BUSINESS

FIG. 17

② SUPPORTING DOCUMENTS

BUSINESS BANK STATEMENTS (1 OF 3)

AUTOMATICALLY IMPORT YOUR BUSINESS BANK STATEMENTS BY CONNECTING YOUR BANK ACCOUNT- BE SURE TO CHOOSE THE ACCOUNT WHERE YOU DEPOSIT BUSINESS REVENUE. NOT ABLE TO CONNECT YOUR BANK? YOU MAY ALSO MANUALLY UPLOAD YOUR 6 MOST RECENT BUSINESS BANK STATEMENTS HERE.

HELPFUL TIPS
- UPLOAD YOUR 2014 TAX RETURNS, AND 6 MOST RECENT BUSINESS BANK STATEMENTS
- HAVE QUESTIONS? CALL US AT 1-800-560-1435

🔍 SEARCH FOR YOUR BANK HERE OR CLICK BELOW

‹ BankofAmerica   CHASE ⊕   citi ›

YODLEE EXTERNAL API ALLOWS BORROWER TO CONNECT TO BUSINESS FINANCIAL ACCOUNTS

ADD ACCOUNTS ✕

PLEASE ENTER THE SAME CREDENTIALS YOU USE TO ACCES YOUR CAPITAL ONE (US) ACCOUNT ONLINE.

*CapitalOne*

USER ID*
[          ]

PASSWORD*
[          ]

CONFIRM PASSWORD*
[          ]

[ ADD ACCOUNT ]

I DON'T KNOW MY SIGN IN FOR THIS ACCOUNT.

‹ BACK

BY PROVIDING YOUR CREDENTIALS, YOU WILL BE ABLE TO VIEW YOUR ACCOUNT(S) BELONGING TO THE ACCOUNT TYPE(S), BANKING, CREDIT CARDS, INVESTMENTS LOANS, MORTGAGES, PAYMENT SERVICES. YOU WILL ONLY NEED TO DO THIS ONCE

*FIG. 18*

*FIG. 20*

AUTO INVEST

PUT YOUR MONEY TO WORK AROUND THE CLOCK AND LET STREETSHARES AUTO INVEST BID FOR YOU.

TO GET STARTED, SET YOUR INVESTMENT CRITERIA, BID AMOUNT AND RATE BELOW. AS LOANS THAT MEET YOUR CRITERIA BECOME AVAILABLE, AUTO INVEST WILL AUTOMATICALLY MAKE BIDS. AUTO INVEST WILL CONTINUE TO MAKE BIDS AS LONG AS IT IS SWITCHED TO THE ON POSITION, THERE ARE AVAILABLE LOANS THAT MEET YOUR CRITERIA, AND YOU HAVE SUFFICIENT FUNDS.

AUTO INVEST IS CURRENTLY: ON    [OFF | ON]    *AUTO INVEST SELECTIONS MUST BE SAVED BELOW TO TAKE EFFECT

---

CHOOSE YOUR RISK CRITERIA:

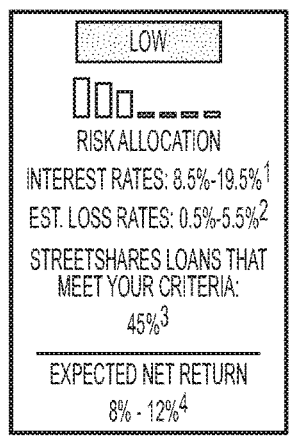
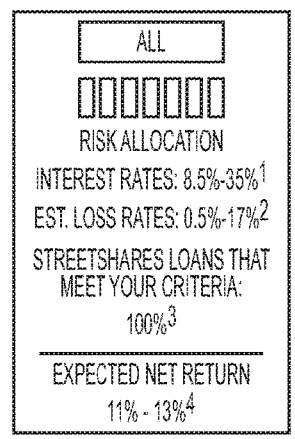
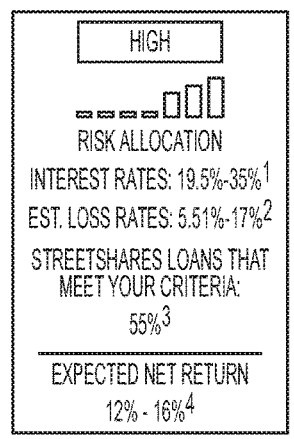

LOW
RISK ALLOCATION
INTEREST RATES: 8.5%-19.5%[1]
EST. LOSS RATES: 0.5%-5.5%[2]
STREETSHARES LOANS THAT MEET YOUR CRITERIA: 45%[3]
EXPECTED NET RETURN 8% - 12%[4]

ALL
RISK ALLOCATION
INTEREST RATES: 8.5%-35%[1]
EST. LOSS RATES: 0.5%-17%[2]
STREETSHARES LOANS THAT MEET YOUR CRITERIA: 100%[3]
EXPECTED NET RETURN 11% - 13%[4]

HIGH
RISK ALLOCATION
INTEREST RATES: 19.5%-35%[1]
EST. LOSS RATES: 5.51%-17%[2]
STREETSHARES LOANS THAT MEET YOUR CRITERIA: 55%[3]
EXPECTED NET RETURN 12% - 16%[4]

WANT TO INVEST FASTER? INCLUDE CLOSED LOANS AMONG YOUR CRITERIA: [OFF | ON] (?)

STREETSHARES INVESTS VARIOUS AMOUNTS IN EVERY LOAN ON THE MARKETPLACE. THIS OPTIONS ALLOWS YOU TO INVEST IN A PIECE OF THOSE CLOSED LOANS HELD BY STREETSHARES THAT MEET YOUR RISK CRITERIA AND ARE CURRENTLY IN GOOD STANDING.

SET YOUR BID AMOUNT:

THE AVERAGE STREETSHARES LOAN AMOUNT IS CURRENTLY $21,800

○ PERCENTAGE OF LOAN [    ]%
● DOLLAR AMOUNT $ [100.00]
WHAT'S THE DIFFERENCE?
YOUR AVERAGE BID AMOUNT: $100

SET YOUR RATE:

THE AVERAGE STREETSHARE RATE IS CURRENTLY 21%

STREETSHARES RATE + [5.00] % (?)

YOUR AVERAGE BID RATE: 26%

[SAVE CHANGES]

INVEST     AUTO INVEST IS CURRENTLY: OFF

ⓘ YOUR ACCOUNT IS NOT FUNDED.
CLICK HERE TO FUND YOUR ACCOUNT.

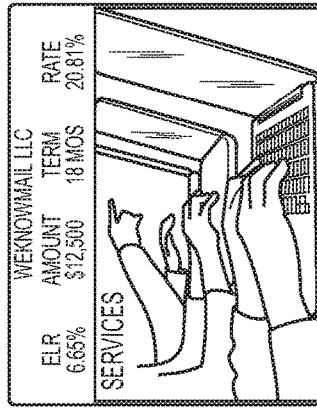

BAZACO INC.
ELR 7.43%   AMOUNT $17,500   TERM 1 YR   RATE 21.86%
SERVICES
REPEAT BORROWER
US VETERAN-OWNED SERVICES BUSINESS SEEKING LOAN
PURCELLVILLE, VA
BAZACO INC. IS A 10+ YEAR OLD US VETERAN-OWNED SERVICES BUSINESS BASED IN PURCELLVILLE, VA, CURRENTLY HAS 3-5 EMPLOYEES, WITH AN ANNUAL REVENUE OF $1M-$10m. RICHARD BAZACO IS REQUESTING A $17,500 LOAN FOR A 1 YEAR TERM.
9H 34M 54S LEFT
$17,500 RAISED    100.0% FUNDED

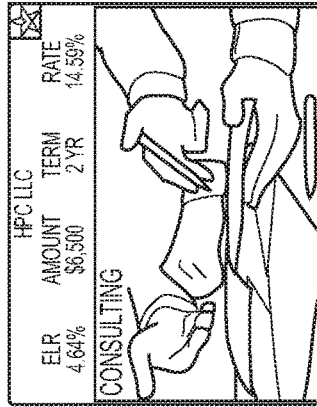

HPC LLC
ELR 4.64%   AMOUNT $6,500   TERM 2 YR   RATE 14.59%
CONSULTING
US VETERAN-OWNED CONSULTING BUSINESS SEEKING LOAN
PANAMA CITY, FL
HPC LLC IS A 7 YEAR OLD US VETERAN-OWNED CONSULTING BUSINESS BASED IN PANAMA CITY, FL, CURRENTLY HAS 1-2 EMPLOYEES, WITH AN ANNUAL REVENUE OF $25K-$100K. ED NAGGIAR IS REQUESTING A $6,500 LOAN FOR A 2 YEAR TERM.
9H 35M 49S LEFT
$17,500 RAISED    100.0% FUNDED

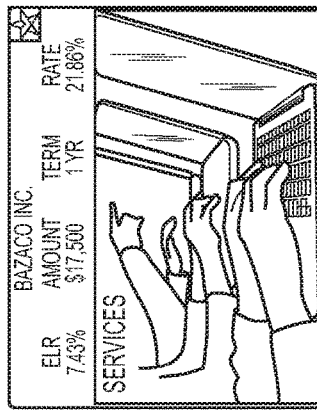

WEKNOWMAIL LLC
ELR 6.65%   AMOUNT $12,500   TERM 18 MOS   RATE 20.81%
SERVICES
SERVICES BUSINESS OWNER SEEKING LOAN
STERLING, VA
WEKNOWMAIL LLC IS A 5 YEAR OLD SERVICES BUSINESS BASED IN STERLING, VA, CURRENTLY HAS 3-5 EMPLOYEES, WITH AN ANNUAL REVENUE OF $100K - $500K. DAVID MEIER IS REQUESTING A $25,000 LOAN FOR A TWO YEAR TERM.
9H 36M 50S LEFT
$12,500 RAISED    100.0% FUNDED

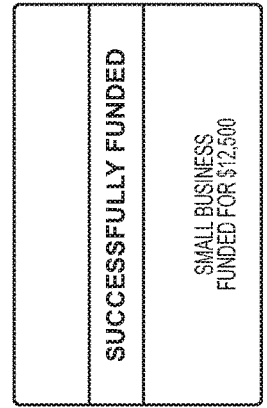
SUCCESSFULLY FUNDED
VETERAN-OWNED SMALL BUSINESS FUNDED FOR $17,500

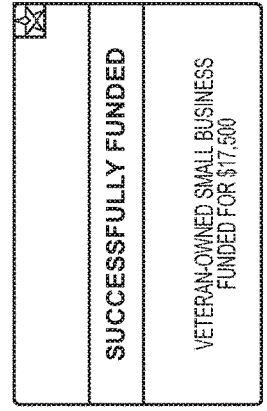
SUCCESSFULLY FUNDED
VETERAN-OWNED SMALL BUSINESS FUNDED FOR $17,500

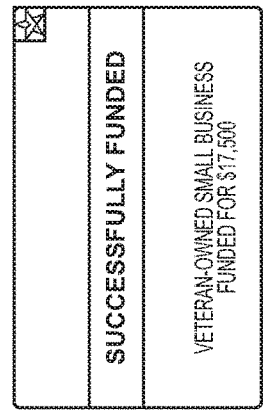
SUCCESSFULLY FUNDED
SMALL BUSINESS FUNDED FOR $12,500

BAZACO INC.

| BIDS | BIZ INFO | PITCH | FINANCIALS | OWNER | FUNDING |

BAZACO INC.
| ELR | AMOUNT | TERM | RATE |
|---|---|---|---|
| 7.43% | $17,500 | 1 YR | 21.86% |

SERVICES

REPEAT BORROWER
US VETERAN-OWNED SERVICES BUSINESS
SEEKING LOAN

PURCELLVILLE, VA

BAZACO INC. IS A 10+ YEAR OLD US VETERAN-OWNED SERVICES BUSINESS BASED IN PURCELLVILLE, VA; CURRENTLY HAS 3-5 EMPLOYEES, WITH AN ANNUAL REVENUE OF $1M-$10m. RICHARD BAZACO IS REQUESTING A $17,500 LOAN FOR A 1 YEAR TERM.

9H 34M 54S LEFT
$17,500 RAISED          100.0% FUNDED

THIS LOAN HAS BEEN 67.0% PRE-FUNDED BY STREETSHARES AND ITS PARTNERS:
AMOUNT: $11,736
RATE: 22.75%

| 0 DAYS | 9 HOURS | 31 MINUTES | 31 SECONDS |

AMOUNT: $ ____    YOUR AVAILABLE FUNDS: $71,380.70
                 DEPOSIT MORE FUNDS
RATE: ____ %     PLACE BID

[-] ACTIVE BIDS (28)

| DATE | NAME | AMOUNT | RATE % |
|---|---|---|---|
| 2-17-16 9:56 AM | JGUIDE | $100 | 17.00% |
| 2-17-16 9:56 AM | JGUIDE | $100 | 18.00% |
| 2-15-16 6:18 PM | BTD | $300 | 18.75% |
| 2-16-16 11:42 AM | BETH BAFFORD | $200 | 18.75% |
| 2-16-16 2:37 PM | LOUIS MANNARINO | $25 | 18.75% |
| 2-15-16 5:20 PM | ART STEVENS | $350 | 19.00% |
| 2-17-16 10:20 AM | STEVE ELLISION | $300 | 19.00% |
| 2-16-16 11:30 PM | BRADK | $25 | 19.00% |
| 2-15-16 5:25 AM | IMA VET | $100 | 19.00% |
| 2-14-16 10:11 PM | JGUIDE | $100 | 19.00% |
| 2-16-16 2:49 PM | TIGER TOM | $250 | 19.00% |
| 2-17-16 9:56 AM | JGUIDE | $100 | 19.00% |
| 2-16-16 11:30PM | SHEEP OF WALL STREET | $100 | 19.25% |

| TOTAL FUNDS RAISED | $17,500 |
|---|---|
| BORROWER'S BLENDED RATE | 21.86% |

*FIG. 27*

MY STREETSHARES

| TOTAL ACCOUNT VALUE | | NET ANNUALIZED RETURNS | | TOTAL INCOME RECEIVED | |
|---|---|---|---|---|---|
| $15,227.48 | | 15.38% | | $727.45 | |
| INVESTED: | $14,179.05 | AVERAGE INTEREST RATE: | 17.87% | INTEREST: | $778.40 |
| IN A BID: | $975.00 | TOTAL SEASONED RETURNS: | 28.29% | SERVICE FEES: | ($50.95) |
| AVAILABLE TO BID: | $73.43 | ADJUSTED NET ANNUALIZED RETURNS: | 12.00% | LATE FEES: | $0.00 |
| AUCTIONS ENDING SOON: 3 | [BID NOW] | LEARN HOW WE CALCULATE RETURNS | | REALIZED LOSSES: | $0.00 |
| [ADD FUNDS] | | | | CUMULATIVE TOTAL INCOME: | $727.45 |
| | | | | PRINCIPAL: | $4365.95 |
| | | | | TOTAL PAYMENTS RECEIVED: | $5,093.40 |

AUTO INVEST IN CURRENTLY: ON

TOTAL NOTES
$14,179.05

NOTE BREAKDOWN (CLICK TO TOGGLE) $/#
PAID IN FULL: $400.00
CURRENT LOANS: $13,818.15
LATE OR DELINQUENT: $360.89
IMPAIRMENT APPLIED: $159.66
CHARGED OFF: $0.00
LEARN ABOUT DELINQUENCY AND CHARGE OFFS

TOTAL NOTES: $14,179.05
VIEW MY NOTES

ACTIVE BIDS

| DATE | BUSINESS NAME | AMOUNT | RATE % |
|---|---|---|---|
| 2016-02-05 8:25 PM | SHARKTANK SPECIAL: R. RIVETER | $25 | 10.00 |
| 2016-02-05 8:25 PM | SHARKTANK SPECIAL: BEARTEK GLOVES | $25 | 10.00 |
| 2016-02-05 8:26 PM | SHARKTANK SPECIAL: MAJOR MOM | $25 | 10.00 |
| 2016-02-15 6:18 PM | BAZACO INC. | $300 | 18.75 |
| 2016-02-15 6:18 PM | HPC LLC | $300 | 11.50 |
| 2016-02-16 7:10 PM | WEKNOWMAIL LLC | $300 | 17.25 |
| | | $975 | |

AUCTIONS CLOSING SOON

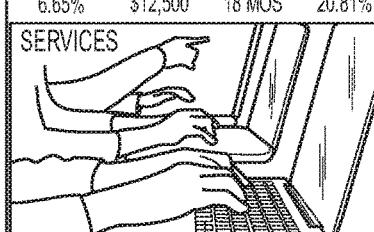

WEKNOWMAIL LLC
ELR 6.65% | AMOUNT $12,500 | TERM 18 MOS | RATE 20.81%
SERVICES

SERVICES BUSINESS OWNER SEEKING LOAN
STERLING, VA

WEKNOWMAIL LLC IS A 5 YEAR OLD SERVICES BUSINESS BASED IN STERLING, VA; CURRENTLY HAS 3-5 EMPLOYEES, WITH AN ANNUAL REVENUE OF $100K - $500K. DAVID MEIER IS REQUESTING A $25,000 LOAN FOR A 2 YEAR TERM.

9H 31M 2S LEFT
$12,500 RAISED    100.0% FUNDED
[BID NOW]

REJECTED BIDS

| DATE | BUSINESS NAME | AMOUNT | RATE % |
|---|---|---|---|
| | | $0 | |

FIG. 28

USER INTERFACE AND SYSTEM FOR USING A NON-PAYMENT DEPENDENT NOTE RETAIL INVESTOR SECURITIES STRUCTURE TO CONDUCT INVESTOR-DIRECTED OR AFFINITY-BASED ONLINE MARKETPLACE LENDING

PRIORITY CLAIM

This non-provisional patent application claims priority to two U.S. Provisional Patent Applications: U.S. Provisional Patent Application No. 62/296,964 filed on Feb. 18, 2016 entitled System And Methods For Inventor-Directed Online Lending Using A Non-Payment Dependent Note Securities Structure and U.S. Provisional Patent Application No. 62/263,331 filed on Dec. 4, 2015 entitled System And Methods For Inventor-Directed Online Lending Using A Non-Payment Dependent Note Securities Structure. This non-provisional patent application hereby incorporates by reference in its entirety U.S. Provisional Application No. 62/296,964 and U.S. Provisional Patent Application No. 62/263,331.

FIELD OF INVENTION

The present invention is in the technical fields of financial transaction computer systems, internet finance, on-line lending, social lending and the purchase and sale of investment securities on-line. More particularly, the invention is in the internet lending-based technical subfields of affinity investment systems, debt investment management systems, credit risk reduction systems, securities law compliance systems, investor-directed lending systems and Peer-to-Peer lending computer systems.

BACKGROUND

On Feb. 17, 2016, a company called Streetshares, Inc. became the first company in the United States to receive qualification from the U.S. Securities and Exchange Commission ("SEC") to offer public securities for funding small business loans to non-accredited retail investors. The lending technology and system described herein implements these new securities, as well as new features to improve these transactions. This technology has applications in other fields as well.

Marketplace Lending (formerly called Peer-to-Peer ("P2P") Lending) is an alternative financing system by which investors use the internet to invest in loans made to borrowers over the internet and outside of the traditional banking structure. Investors ("Investors") can be individuals or institutions. Borrowers ("Borrowers") may be individuals, business, or organizations.

Contemporary Marketplace Lending is usually conducted without the Investor making a loan directly to the Borrower. Rather, Marketplace lending is accomplished through an intermediary. An intermediary ("Intermediary") is most often a private company that operates an online loan marketplace, or a private company non-bank lender that makes loans using a Marketplace/P2P lending structure.

In 2008 and 2009, an initial regulatory structure was approved by the SEC for how to legally conduct consumer loan P2P Lending over the internet in the United States. The SEC's approved system placed online intermediaries in between Borrowers and Investor, and placed those intermediaries at the center of two correlated transactions. The first transaction is the loan made by the Intermediary to a Borrower using funds committed by Investors to back a particular loan. The second transaction is a Payment Dependent Note ("PDN") sold by the Intermediary to the Investors who committed funds to back that particular loan. Multiple PDNs correlate to a single underlying loan made to a Borrower by the Intermediary. PDNs are a special, limited obligation to the Investors made by the Intermediary. Importantly, repayment on PDNs to Investors by the Intermediary is wholly dependent on repayment to the Intermediary by the Borrower on the underlying loan. In other words, an Investor who backed a loan by purchasing a PDN from the Intermediary will only be paid back if the Borrower who received the corresponding loan from the Intermediary makes repayment on the underlying loan.

In approving a structure in which loan risks are passed on to the Investors, the SEC limited P2P Lending to either: 1) sophisticated investors and institutions via a private placement of securities without a public risk filing with the SEC (these investors were deemed capable of understanding the risks of the loan and wealthy enough to absorb the consequences of a poor investment), or 2) to non-accredited Investors via a public risk filing with the SEC by P2P Intermediaries (those investors which, by the SEC's definition, were less sophisticated and less wealthy and therefore needed the safeguards of SEC regulation). P2P Lending became known as Marketplace Lending is approximately 2014.

For Marketplace/P2P loans backed by non-accredited Investors, the SEC limited Marketplace/P2P lending to Intermediaries that made consumer loans. Until Streetshares, Inc. obtained SEC approval in February 2016, the SEC did not approve of a Marketplace/P2P Lending system for non-accredited Investors lending to other kinds of Borrowers, such as small businesses.

What is needed are systems and methods for improved Marketplace/P2P Lending. What is needed are systems and methods for digital end-to-end technology solutions for lending. What is needed is improved small business digital lending methods and systems.

What is needed is affinity investment systems and methods for online and peer-to-peer lending. What is needed are auto investment systems and methods for online investments and peer-to-peer investments. What is needed are auto investment systems and methods including investment criteria selection for risk, rate and/or bid amounts. What is needed is an auction or funding period system to fulfill on-line loans. What is needed are online peer-to-peer lending systems with auction or funding period bidding and automatic payment distribution to investors.

What is needed are systems and method for non-accredited Investor Marketplace/P2P lending to non-consumer loan Borrowers including small businesses. What is needed is implementation of a new structure and algorithms that will permit non-accredited Investor Marketplace/P2P lending to non-consumer loan Borrowers including small businesses. What is needed is a technology for computer implementation of an Non-Payment Dependent Note ("NPDN") structure—one in which all risks of the loans are not passed on to investors—that permits non-accredited investors to back loans to every kind of Marketplace/P2P Borrower, including businesses, non-profit organizations, automobile purchases, real estate purchases, and all other forms of lending. What is needed is on-line systems and methods designed to permit non-accredited investors to participate in all forms of Marketplace Lending on equal footing with the Marketplace/P2P Lending activities permitted to wealthier accredited investors.

What is needed are systems and methods for investors to compete to fulfill desired loans. What is needed are systems and methods for borrowers to compete for investor funding.

The content in this Background is not admitted as prior art by Applicant and is simply provided as introductory material to assist the reader in understanding. Applicants provisional applications cited above pre-date some of the materials disclosed in the Background.

SUMMARY OF INVENTION

Except where specifically noted, the terms Investor(s), Borrower(s), and Intermediary/Intermediaries are used throughout this application to refer to participants not only in a Marketplace/P2P lending transaction, but also non-Marketplace/P2P-related transactions.

Systems and methods for conducting Marketplace/P2P Lending consists of 5 basic steps [See FIG. 1]. This five-step process involves the Intermediary issuing a payment dependent note ("PDN") to the Investor. A PDN is a promise from the Intermediary to pay the Investor principal and interest only if a Borrower makes payment to the Intermediary on the underlying loan made by the Intermediary to the Borrower. A PDN allows the Intermediary to pass the risk of the loan on to the Investor. Many Marketplace/P2P systems and methods use a PDN structure. One of the present inventions described in this application is a unique system and method for conducting Marketplace/P2P Lending using a Non-Payment-Dependent Note ("NPDN") structure. An NPDN structure avoids the Investor risk problems associated with a PDN structure.

An important element of Marketplace/P2P lending is that Investors can elect to invest in a particular loan or group of loans of the Investor's choosing. This is in contrast to the more common method used in most investment vehicles in which Investors invest in a pool of assets selected by an Intermediary, such as an investment fund. In other words, Marketplace/P2P lending is unique in that the Intermediary allows the Investor to elect what loans the Intermediary makes with the funds provided to the Intermediary by the Investor. One of the present inventions uniquely preserves investor direction of funds, while giving the Investor the risk avoidance benefits of an NPDN structure.

The disclosed Marketplace/P2P lending technologies provide a powerful, convenient and easy solutions to online lending. The disclosed technologies provide for financial institutions to set-up a digital end-to-end business lending system. The disclosed methods and systems take advantage of auction or funding period, affinity investing, auto investing and/or NPDN. The disclosed systems allow various combinations of these features to be used together.

The disclosed Marketplace/P2P lending technologies enables prospective borrowers to apply through their smartphone/tablet/desktop device and get underwritten in a matter of minutes without any physical paperwork. The Marketplace/P2P systems and methods connect with external services such as, but not limited to, Yodlee, Docusign, Veritax and QuickBooks to give the underwriter or credit module a holistic view of the borrower including cashflows, taxes and financial ratios, in order to make a fully digital lending decision. In some embodiments, the Marketplace/P2P systems and methods are integrated with Salesforce.com and Pardot, which are used to manage customer contact throughout the process. In another embodiment, the data is stored real time in Amazon Web Services (AWS) and is fully secured and encrypted.

One of the objects of the invention is to provide better computerized systems and methods for digital lending and Marketplace/P2P lending. Another object of the invention is to provide systems and methods for improved on-line lending. One of the objects of the invention is improving systems and methods for Marketplace/P2P lending for small business. One of the objects of the invention is improving systems and methods for Marketplace/P2P lending using non-accredited investors. One of the objects of the invention is improving systems and methods for Marketplace/P2P lending using a Non-Payment Dependent Note ("NPDN") structure. One of the objects is improving systems and methods for digital end-to-end technology solutions for lending. Another object is improvements in small business digital lending methods and systems.

Another object of the invention is to support on-line loan auction or funding periods or competitive methods of filling loan requests.

Another object of the invention is to support automatic payment distribution to investors. Yet, another object of the invention is to simplify and streamline automatic payment distribution calculation and disbursements. Another object of the invention is to support automatic payment distribution to investors. Yet, another object of the invention is to simplify and streamline automatic payment distribution calculation and disbursements.

Another object of the invention is to support automatic payment distribution to investors. Yet, another object of the invention is to simplify and streamline automatic payment distribution calculation and disbursements.

Other objects of the invention include use of affinity—social loyalty between individuals with shared traits—to improve borrowing and lending. Another object of the inventions includes use of affinity based borrowing and loan auction or funding periods.

One of the objects is to use affinity in Marketplace/P2P lending and small business lending. One of the objects is to use affinity in digital lending.

Some embodiments are directed to computerized systems and methods for Investor-directed online lending using a Non-Payment Dependent Note ("NPDN") securities structure. This embodiment has applications both in Marketplace/P2P lending and other forms of investor-directed financing. The NPDN systems and methods are useful in internet-based Marketplace/P2P lending.

Marketplace/P2P Lending prior to NPDN involved the Investor receiving Payment Dependent Notes (PDNs) from the Intermediary and exposed Investors directly to the credit risk of the underlying loans selected by the investor. One of the objects of the invention is to reduce or eliminate the exposure by Investors to the credit risk of underlying loans in Marketplace/P2P lending.

Another object of the invention is to allow Investors to receive Non-Payment Dependent Notes (NPDNs) from the Intermediary, thus reducing or shielding Investors from the direct credit risk of the underlying loans. Other objects of the invention include permitting Investors to receive fixed principal and interest repayments from the Intermediary, making Investors eligible for a discretionary bonus granted to the Investor by the Intermediary depending on the performance of the elected loans, and—unlike existing investment fund or bank models—uniquely preserves the ability for Investors to elect the loans the Investor wishes his investment to fund.

Some inventions relate to systems and services to provide powerful, convenient and/or easy ways for peer-to-peer or on-line lending. Other inventions relate to ways for to set up a digital end-to-end lending solutions including for small businesses. Some inventions relate to auction or funding periods to fund loans or portions of loans. Other inventions bring affinity systems and methods to online lending and Marketplace/P2P Lending. Other inventions relate to systems and methods for investor-directed online lending using a non-payment dependent note securities structure. Other inventions relate to auto investment systems and methods for use with on-line lending systems.

BRIEF DESCRIPTION OF THE DRAWINGS

FIG. 15 is a first screen shot in a series of screens for prequalifying for a business loan.

FIG. 17 is a third screen shot in a series of screens for prequalifying for a business loan.

FIG. 18 is a first screen shot of a user interface for borrower approval and supporting documents.

FIG. 20 shows exemplary affinity symbols and logos used with an affinity lending system.

FIG. 22 is an example of a full screen webpage view or generated screen display for an auto invest system and method for risk criteria selection and setting bid amounts and setting rate percentage.

FIG. 25 is a screen display for an investor view of borrowers raising funds or recently funded.

FIG. 27 is an exemplary screen display of a borrower's bid page with active bid information.

FIG. 28 is an exemplary investor's dashboard view of his activity including account info, total notes, active bids or orders and rejected bids or orders.

DETAILED DESCRIPTION

Figure 1:
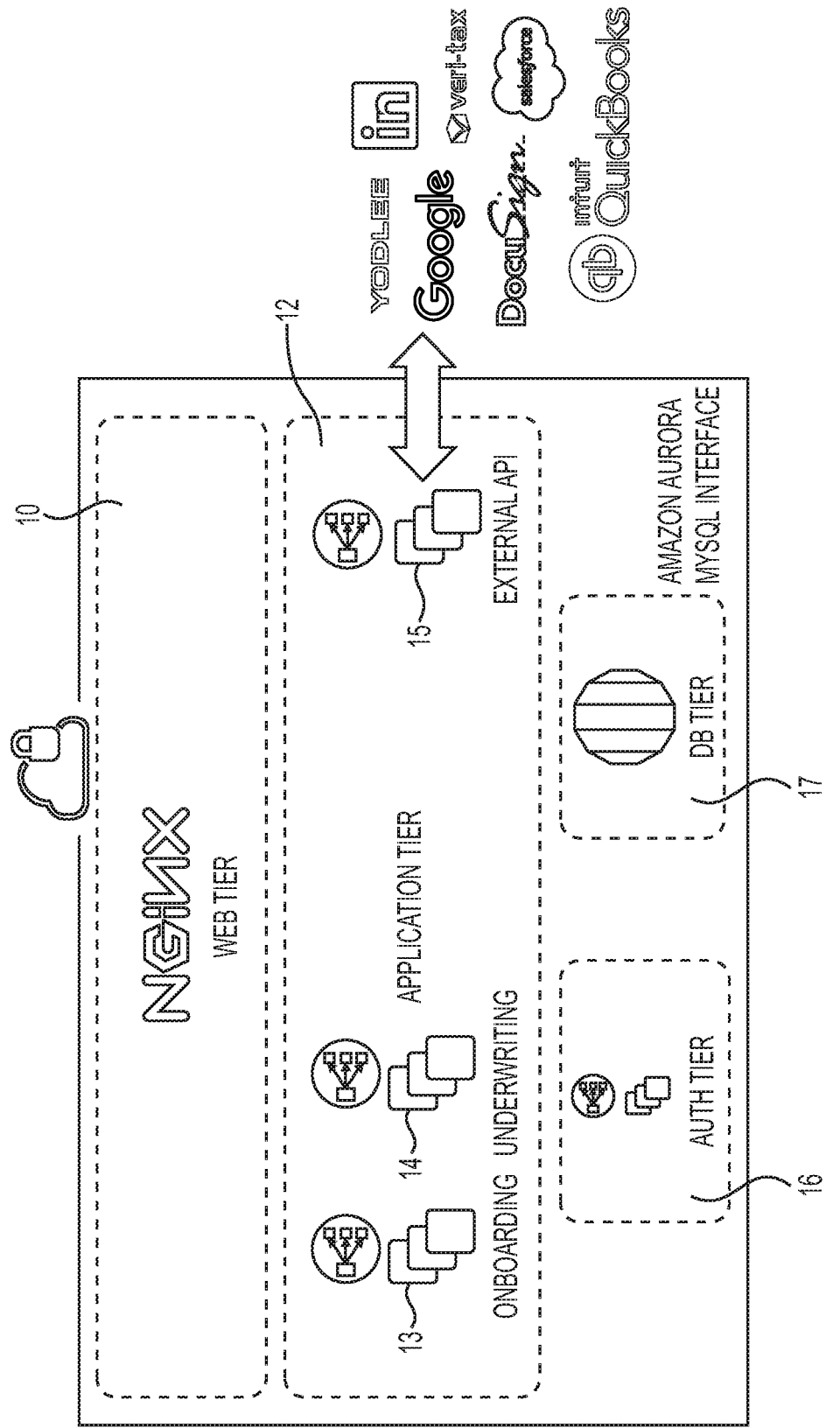
FIG. 1 is a reference architecture diagram of a lending system.

Following is an outline of the content in the detailed description in the order discussed:
High Level View of Reference Architecture
Basic Process Flow and Steps
Onboarding Service:
Underwriting/Decision Service:
External API Service:
Authorization Tier:
Underwriting System
Workflow Management System
Real Time Email Delivery
Salesforce.com Module
Olark Chat Module:
Detailed Process Flow and Steps
Onboarding Borrower Experience
API References
Onboarding API
Underwriting/Decision API Service:
External API Service
Authorization API Service
Affinity systems and methods
Auto invest systems and methods
NPDN embodiments
Auction or Funding Period Bidding
Distribution of loan payment
Dashboards, displays and reports
Exemplary hardware description
Conclusion
High Level View of Reference Architecture Referring to FIG. 1, a reference architecture diagram is provided wherein the architecture is depicted. At a high level there are four primary tiers in the exemplary Marketplace/P2P reference architecture as depicted in FIG. 1.

1. Web Tier 10—This tier receives all external requests and redirects to the appropriate application tier service. The example uses the NGINX webserver which is an HTTP/HTTPS server and reverse proxy. NGINX is known for its high performance, stability, rich feature set, simple configuration, and low resource consumption. Other servers may be used.

2. Application Tier 12—In this example, this tier consists of three services:

a. Onboarding Service 13—This example service handles all borrower onboarding data. A rest API handler receives data from clients to save to the database. Calls are made to the underwriting platform for automated pre-approval decisioning. Calls are also made through the External API service to handle Yodlee, taxes etc.

b. Underwriting/Decision Service 14—This example service receives calls from onboarding service to initiate the pre-approval process. It displays the status of each application to underwriting and sales teams, and has a built in workflow checklist and notes repository. This service makes API calls to the External API service to retrieve necessary data for underwriting. It also makes API calls to Equifax and TransUnion. Underwriting has the ability to make pre-approval and approval decisions manually if necessary.

c. External API Service 15—This example service interacts with external APIs such as Google Places, LinkedIn, Yodlee, Docusign, Veritax, Salesforce.com, Equifax, TransUnion and QuickBooks to help a prospective borrower quickly move through the application and provide all the data digitally to underwriting.

3. Authorization Tier 16—This example tier manages user accounts, login calls and permissions.

4. Database Tier 17—This example tier uses an Amazon Aurora database with MySQL tools. The Onboarding Services API and S3 storage services are used for large files.

Basic Process Flow and Steps

Referring to FIGS. 2 through 10, basic steps and flows of the lending system are described. The following section depicts examples of different process flows for each Service. For a deeper dive into specific API calls, see the Detailed Process Flow and Steps section as well as the API Reference section.

Figure 2:
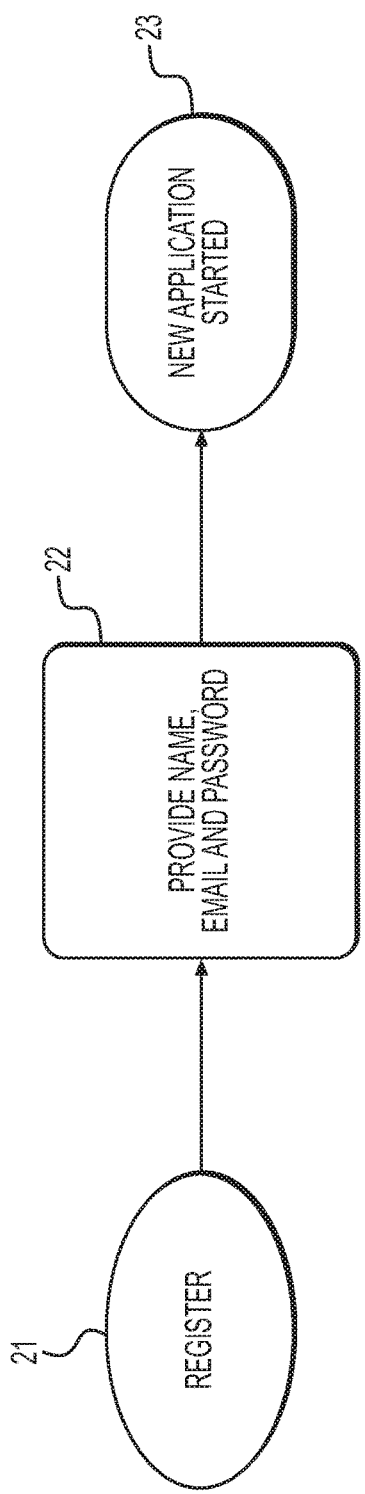
FIG. 2 is a flow diagram showing step 1 of an exemplary Onboarding Service for a lending system.
Figure 3:
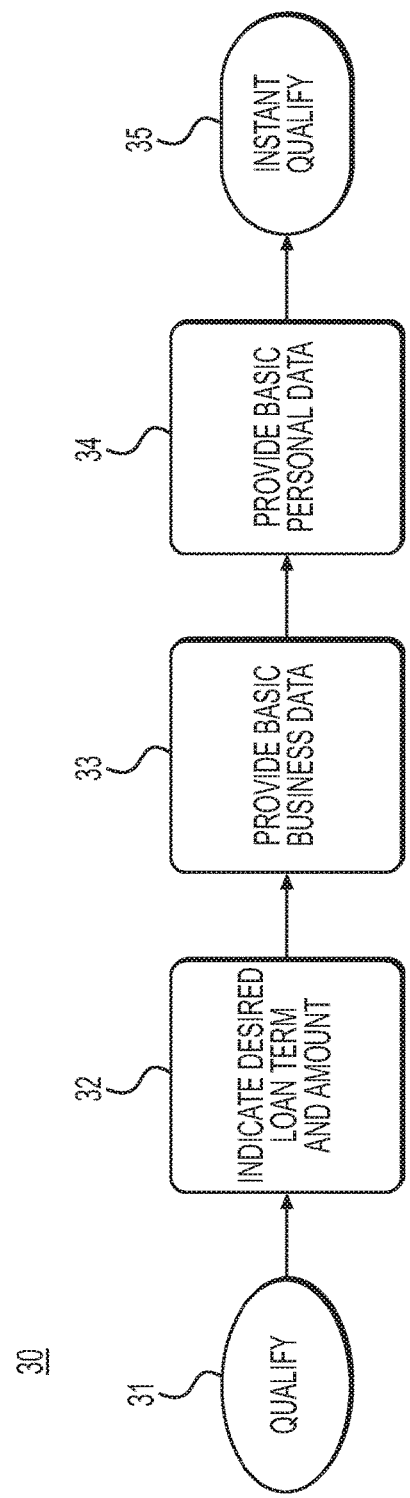
FIG. 3 is a flow diagram showing step 2 of an exemplary Onboarding Service for a lending system.

Onboarding Service:

In the example shown in FIG. 2, the first step for the borrower is to register 21 an account with the system. This can be done with either a username/password combination 22 or by authorizing a LinkedIn account to use the Marketplace/2P service. Following registration, a new borrower application can be started 23. The following example depicts the process flow for registering an account with a username/password combination:

Referring to FIG. 3, the second step in the borrower onboarding process is to provide information to prequalify for a loan 31. This requires the borrower to submit information 32, 33, 34 which the Onboarding Service saves directly and in real time to the database so if the borrower loses connectivity, all fields are already saved. If a borrower leaves, they can pick up where they left off once they return to the application. After submission by the customer, the Onboarding Service will call the Underwriting/Decision Service in order to establish in real time if the customer has prequalified/preapproved 35.

Figure 4:
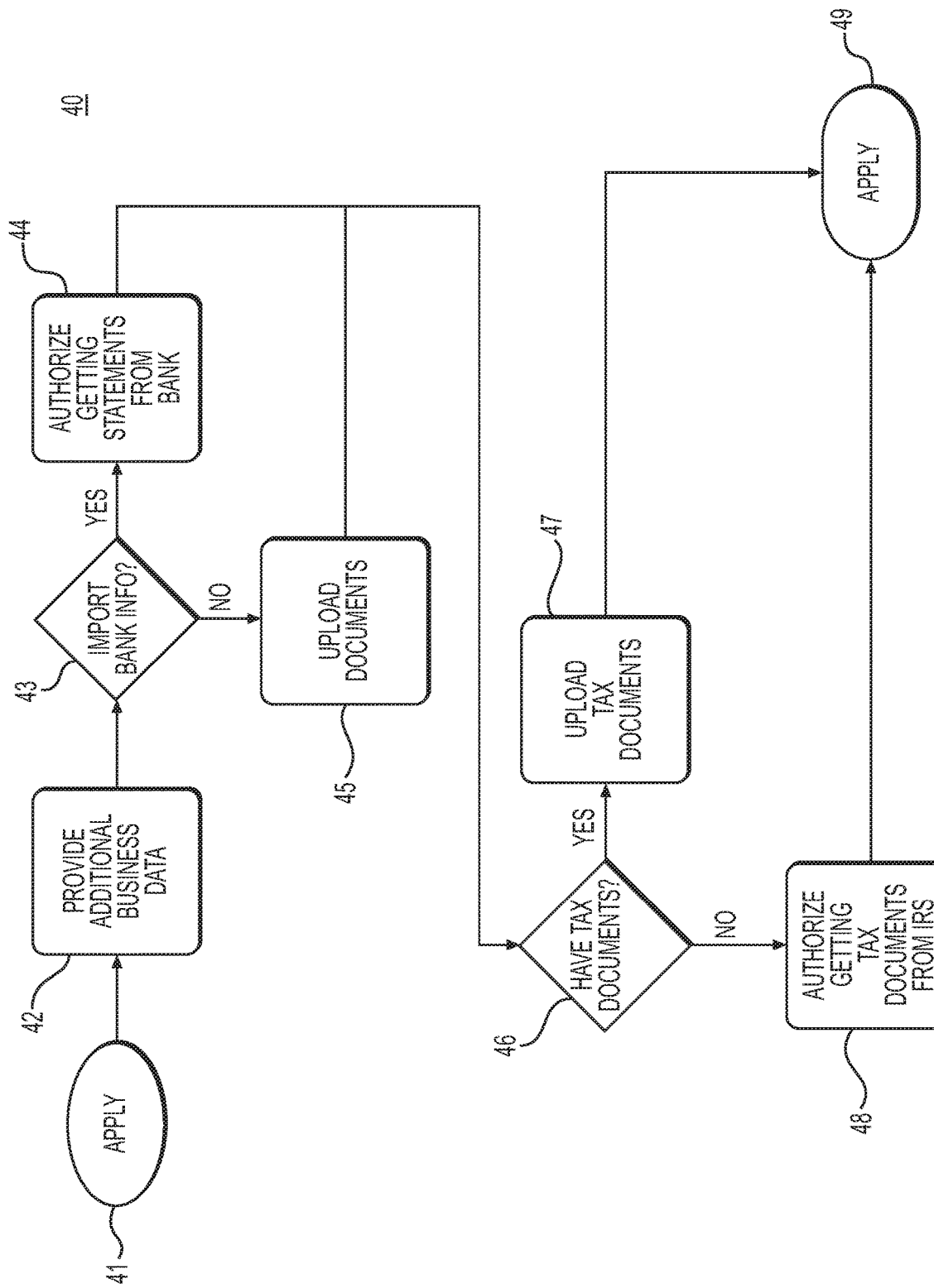
FIG. 4 is a flow diagram showing step 3 of an exemplary Onboarding Service for a lending system.

Referring to FIG. 4, the final step in the application 41 and borrower onboarding process is to add additional documentation 41 by either manually uploading or electronically transferring documents 43, 44, 45, 46, 47, 48. In some embodiments, electronic transfer of supporting documentation occurs by connecting to: the borrower's bank 44 (e.g., via Yodlee), the IRS for tax transcripts 48, and financial statements 42 (e.g., through QuickBooks). The result of this step is applying for a loan 49 through submission of documentation for final underwriting.

Figure 5:
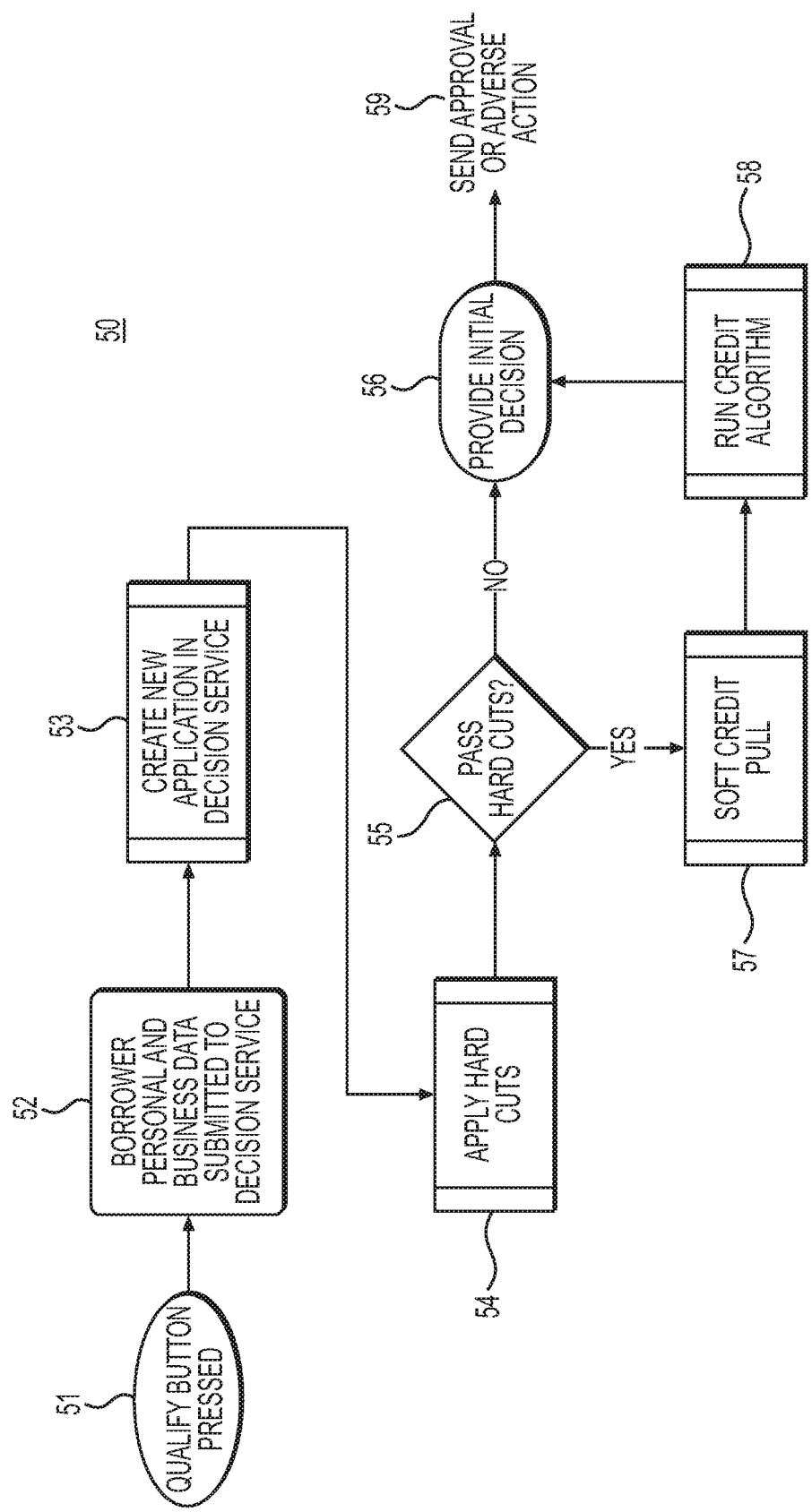
FIG. 5 is a flow diagram showing step 1 of an exemplary Underwriting/Decision Service for a lending system.
Figure 6:
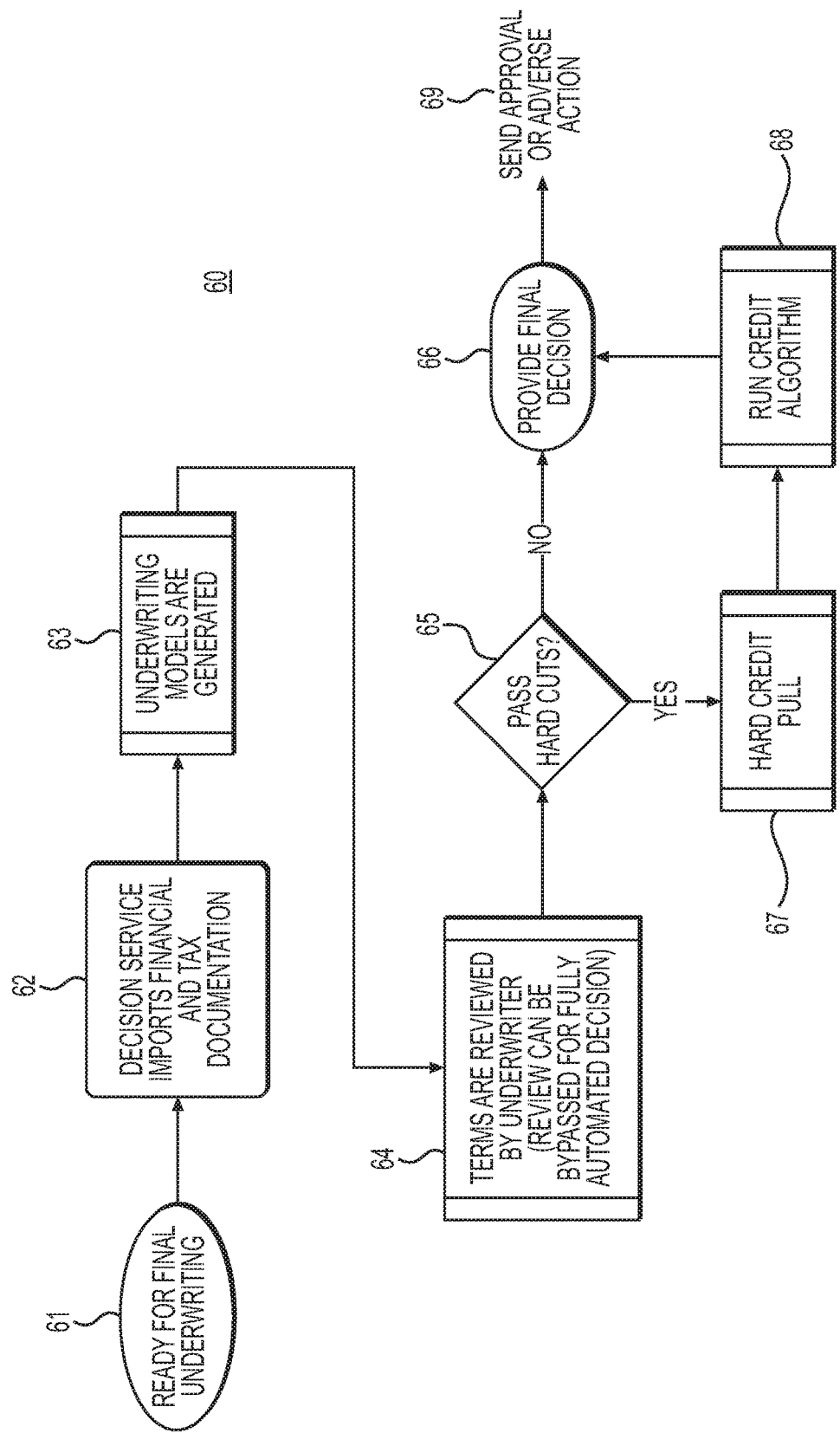
FIG. 6 is a flow diagram showing step 2 of an exemplary Underwriting/Decision Service for a lending system.

Underwriting/Decision Service:

Referring to FIGS. 5 and 6, exemplary underwriting and decision services are described. Qualifying can be requested by borrower by simply selecting an on-screen button 51. The first step in the Underwriting/Decision Service is to receive an application from the Onboarding Service with a prequalify request. The Decision Service will follow the example process flow in FIGS. 5 and 6 to make a pre-approval decision and return the decision back to the Onboarding Service for real time communication with the borrower.

The second step in the Decision Service is to retrieve all relevant documentation that was either manually uploaded or directly pulled from external services 52. A new application is created by the decision system 53. The data is combined and run through decisioning algorithms for consideration by an underwriter or an automated decisioning framework (e.g., run credit algorithm 58). Hard cuts may be applied 54, 55 credit scores may be pulled 57 and credit algorithms run 58. Once the review has been completed, a final decision by the automated decision system 56 is returned to the borrower 59.

Referring to FIG. 6, a final underwriting is performed 60. Underwriting can be manual, a combination of automated and manual or the process can be fully automated. In one embodiment, the steps are performed as described and flow as shown in FIG. 6 (61, 62, 63, 64, 65, 66, 67, 68, 69). If the borrower doesn't pass the underwriting criteria, an Adverse Action letter containing all the relevant adverse action reasons and requisite scores is automatically generated and sent to the borrower 69. In this example, adverse action notifications 69 are held for 24 hours to allow time to manage sensitive customers if necessary, but also to avoid the appearance of triviality in the decision-making process.

Figure 7:
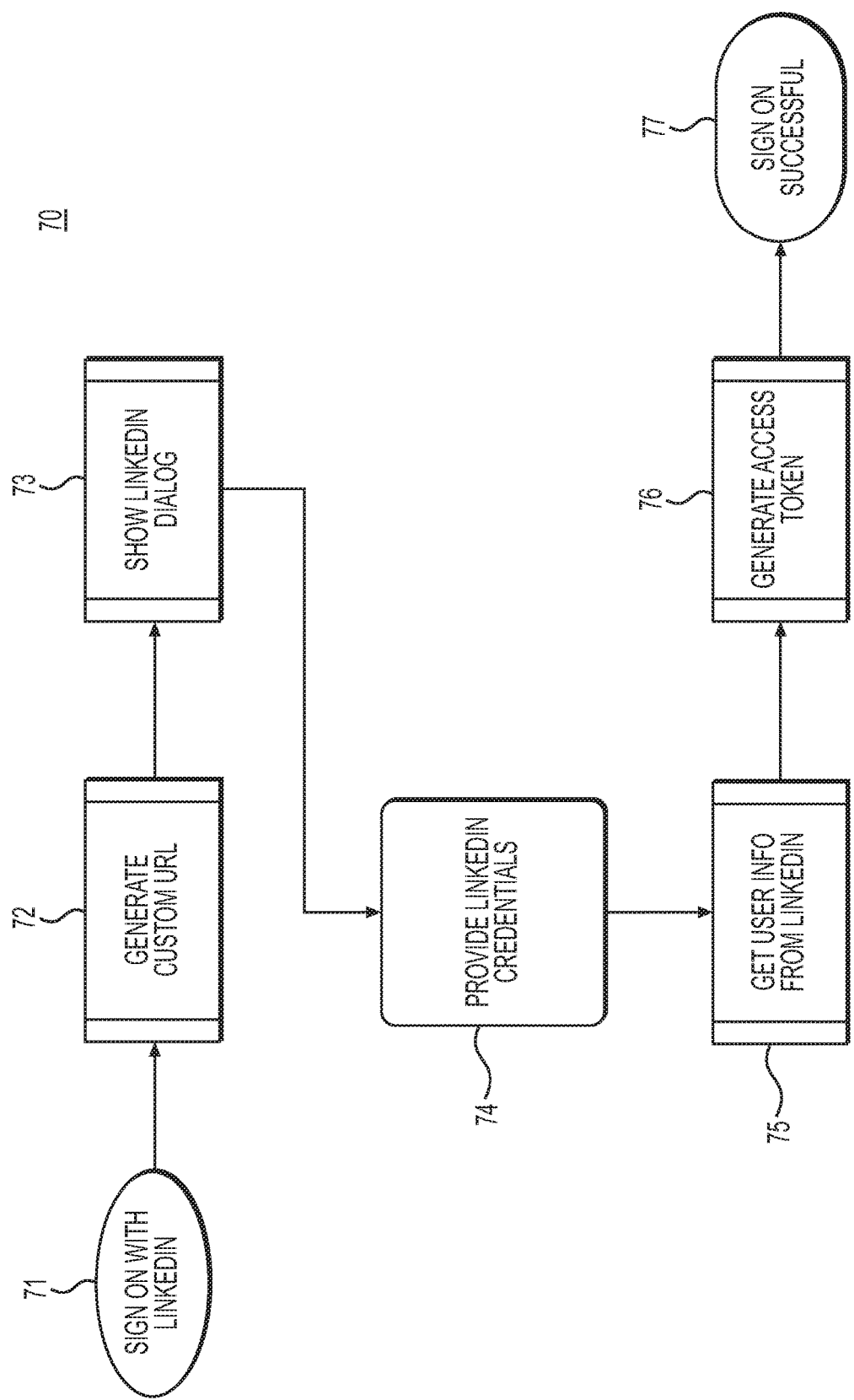
FIG. 7 is a flow diagram of an exemplary External API Service for access to a lending system.

External API Service:

Referring to FIG. 7, a Marketplace/P2P service may provide connectivity to various external systems such as LinkedIn, Yodlee, Docusign, Veritax, Google, QuickBooks, etc. each with its own API. Sign on can be through or with an external system, 71. These links allow for sharing of information and credentials and tokens to be used from external systems 73, 74, 75, 76. FIG. 7 shows a basic process flow for integration with the LinkedIn API as an example process 71, 72, 73, 74, 75, 76. A successful sign on is generated through the external service 77.

Figure 8:
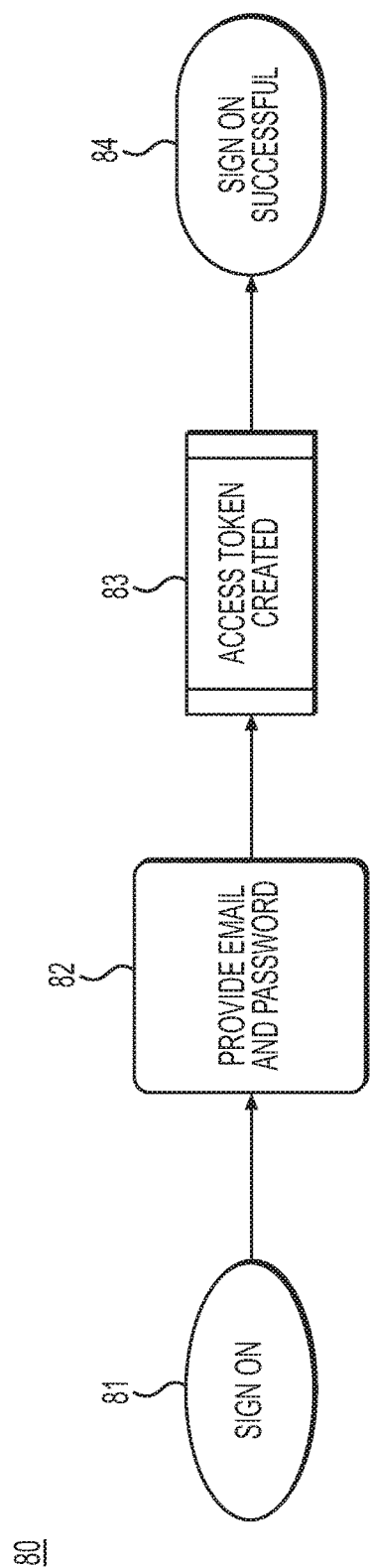
FIG. 8 is a flow diagram for a sign on step of an authorization tier of API service.

Authorization Tier:

Referring to FIG. 8, an authorization tier is shown. In many embodiments, the authorization service of the Marketplace/P2P service architecture provides authentication and permission checks for each call made to the other services. In other embodiments, authentication and permission checks may be performed on only certain calls to other services. FIG. 8, shows a first process flow 80 illustrating the act of signing on to the system 81, 82 and having an access token created 83. Following, the system is notified of a successful sign on 84.

Figure 9:
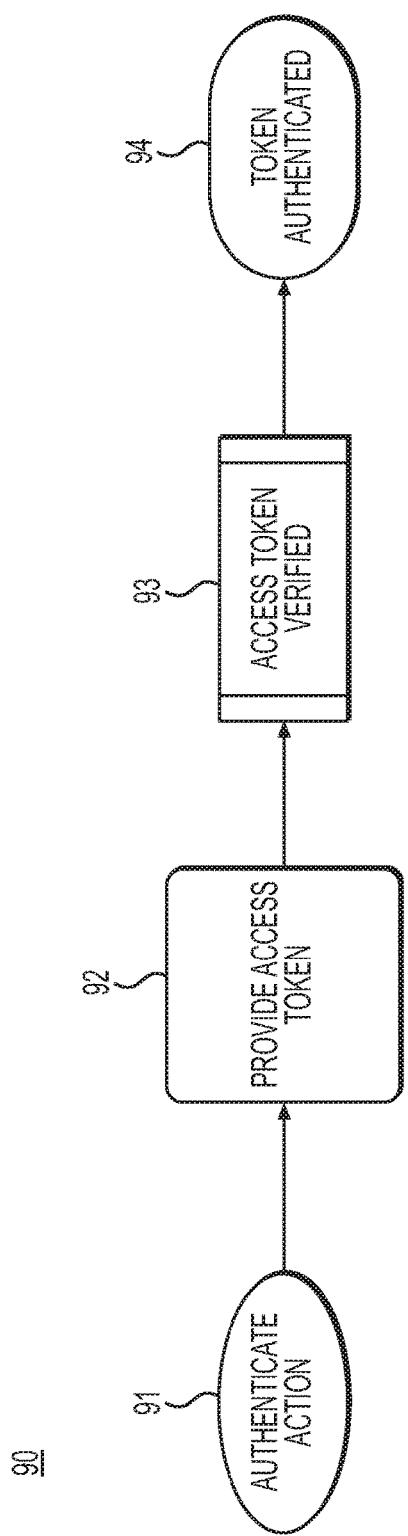
FIG. 9 is a flow diagram for authenticating action in an Authorization Tier API Service.

Referring to FIG. 9, the next example is a basic process flow 90 for authenticating actions in the system. As a borrower steps through the system processes, each action is authenticated with a token 94 to be sure the borrower has the permission to take the requested action and is the owner of that specific application. The system follows the steps of an authentication action 91, providing access token 92, verifying access token 93 and authenticating token 94.

Figure 10:
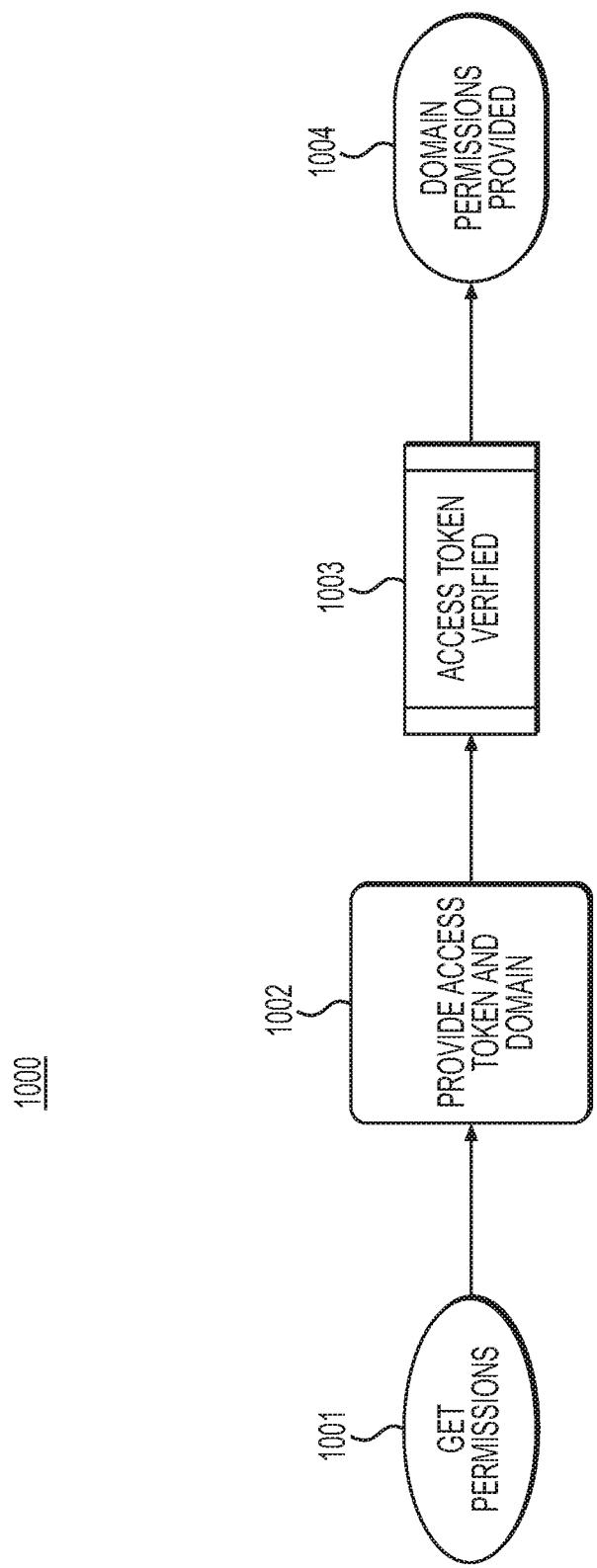
FIG. 10 is a flow diagram for checking permission to access a specific domain in an Authorization Tier API Service.

Referring to FIG. 10, in this example a basic process flow for checking permissions to access a specific domain within the system is depicted 1000. This particular checking permission process requires both a token and the domain that the user is trying to access in order to provide permission. The process includes getting permissions 1001, providing access token and domain 1002, access token verification 1003 and finally domain permissions provided 1004.

Underwriting System

Underwriting systems are used by credit groups in organizations. Following is an exemplary system is used by a credit group for underwriting on-line lending. This system gives the underwriter a holistic view of the borrower including cashflows, taxes and financial ratios etc. This helps the underwriter in making a fully digital holistic lending decision. The underwriter also has the ability to send the loan back if more information is required from the customer.

The system collects and provides the following information to the underwriter:

Business and Personal Data: Information on the applicant including amount requested and the business including secretary of state incorporation data Credit Data: Summarized and detailed personal and business credit information including the automated system decision Cash Flow Data: Business cash flows analysis that shows cash inflows, cash outflows, net cashflows, NSFs, balances etc.

Financial Statements Data: Financial statements (Balance Sheet, P&L, Cashflows) and key financial ratios Tax Data: Summary of personal and businesses taxes Social Data: Social media data including Facebook, LinkedIn, Google maps etc.

Adverse Action Reason: Adverse action reasons if declined

The system also has an admin module to manage the system access and privileges with the following features:

Ability to assign deals to underwriters in round robin way or manually by the system admin Ability to add underwriters Ability to manage the permissions e.g. who can approve, decline, edit or see Workflow Management System This exemplary module is integrated with the underwriting system. It is used by the underwriter/loan processor to ensure that all the necessary steps have been followed before funds are released. It also has the capability to send the loan back if more information is required. Here are some of the other capacities of the system 3 primary states of the business in active underwriting a) Pending review b) In actual review c) Additional details needed for prioritization Comprehensive checklist to ensure all steps are being followed Running log of changes that are being made by credit/sales Real time notification to sales if more information is required Real time notification to underwriting if incremental information has been received Real Time Email Delivery There are also services set up to send real time trigger or campaign ("funnel management") based emails to customers. The email services are primarily broken into four types:

1. Account creation trigger email—For example, as soon as an account is created, the borrower is notified about the successful creation of the account
2. Personalized sales emails—For example, these emails are initiated by Salesforce.com.
They are personalized messages from the assigned sales person to the borrower
3. Drip email campaigns—For example, Pardot may be used —an email automation tool to send regular emails to the borrowers based on their state within the funnel
4. Adverse Action emails—For example, if the borrower is declined in underwriting, an automated adverse action email is generated and sent to the borrower Salesforce.com Module In some embodiments, a sales contact module or interface is used. The exemplary Salesforce.com module communicates with the onboarding service, receives new application inputs, and automates part of the sales-borrower interaction. The Salesforce.com module can be configured such that it automatically:

Populates Salesforce.com with customer information when an application is started Assigns a sales person to each application and notifies the sales person of the opportunity Updates loan applications real-time through application lifecycle stages (incomplete, preapproved, funded, etc.) or any new borrower input Sends personalized email messages from the assigned sales person to borrower, triggered at different application stages Provides instant click-to-dial capability in Salesforce.com dashboard for sales rep Captures all phone and e-mail communication and creates a log for any sales rep to review Interoperability across the sales team—if a borrower calls in, any sales person will have immediate access to their file and all communications Olark Chat Module:

In some embodiments, a chat module is used. An exemplary chat module is the Olark Chat module which is integrated with Salesforce.com and onboarding service. It is fully desktop and mobile enabled. The chat functionality is available across the whole onboarding process including landing page. In one embodiment, the chat module is configured such that:

New leads are instantly created in Salesforce.com

All chat transcripts automatically recorded and logged

Co-browsing functionality provides ability for sales to:
Conduct a screen share with on one click (no software install required for customer)
Take control of customer's application with one click (no software install required for customer)

Figure 11:
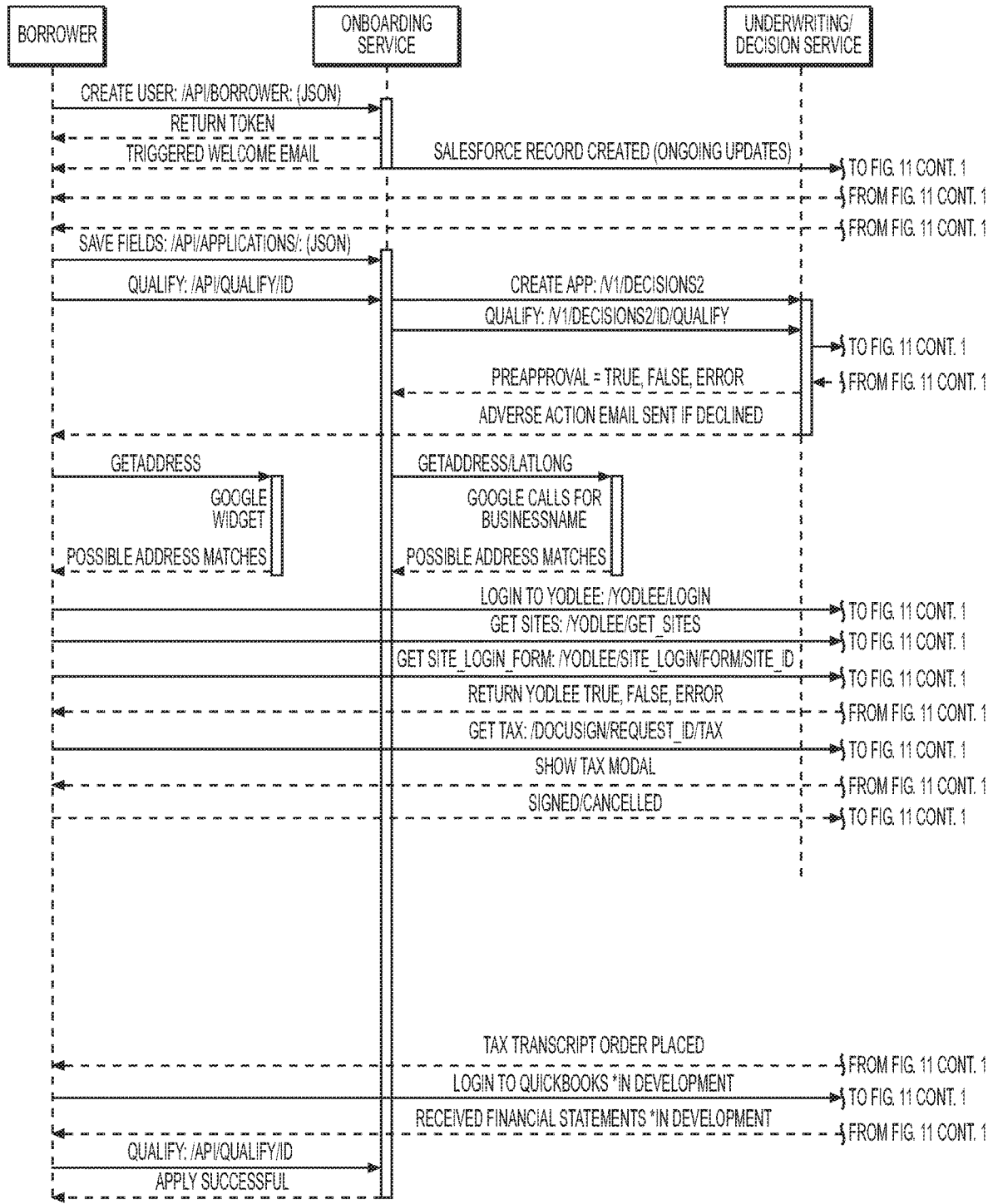
FIG. 11 is a detailed interaction diagram showing detailed process flow for onboarding interactions.
Figure 11:
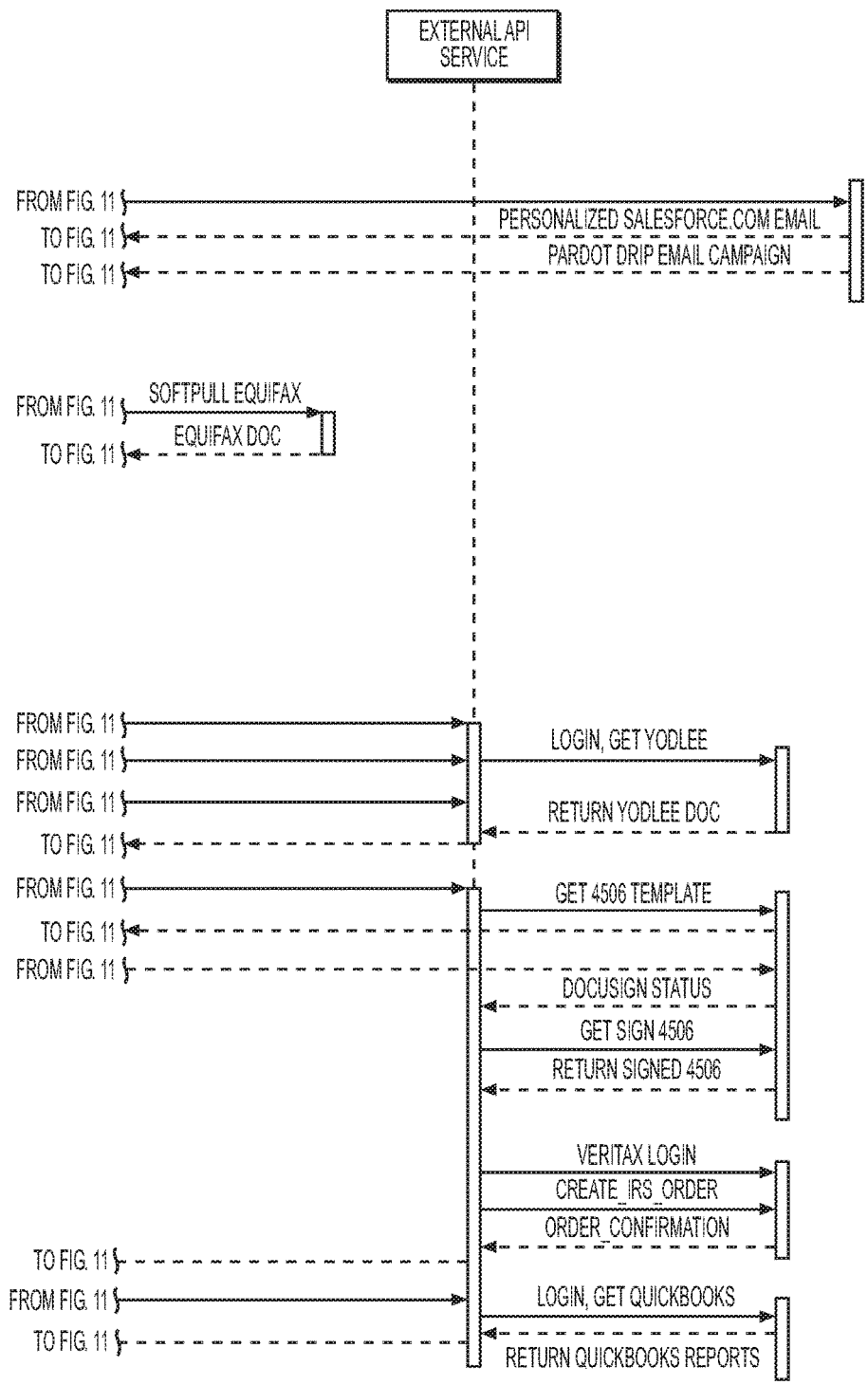
Figure 12:
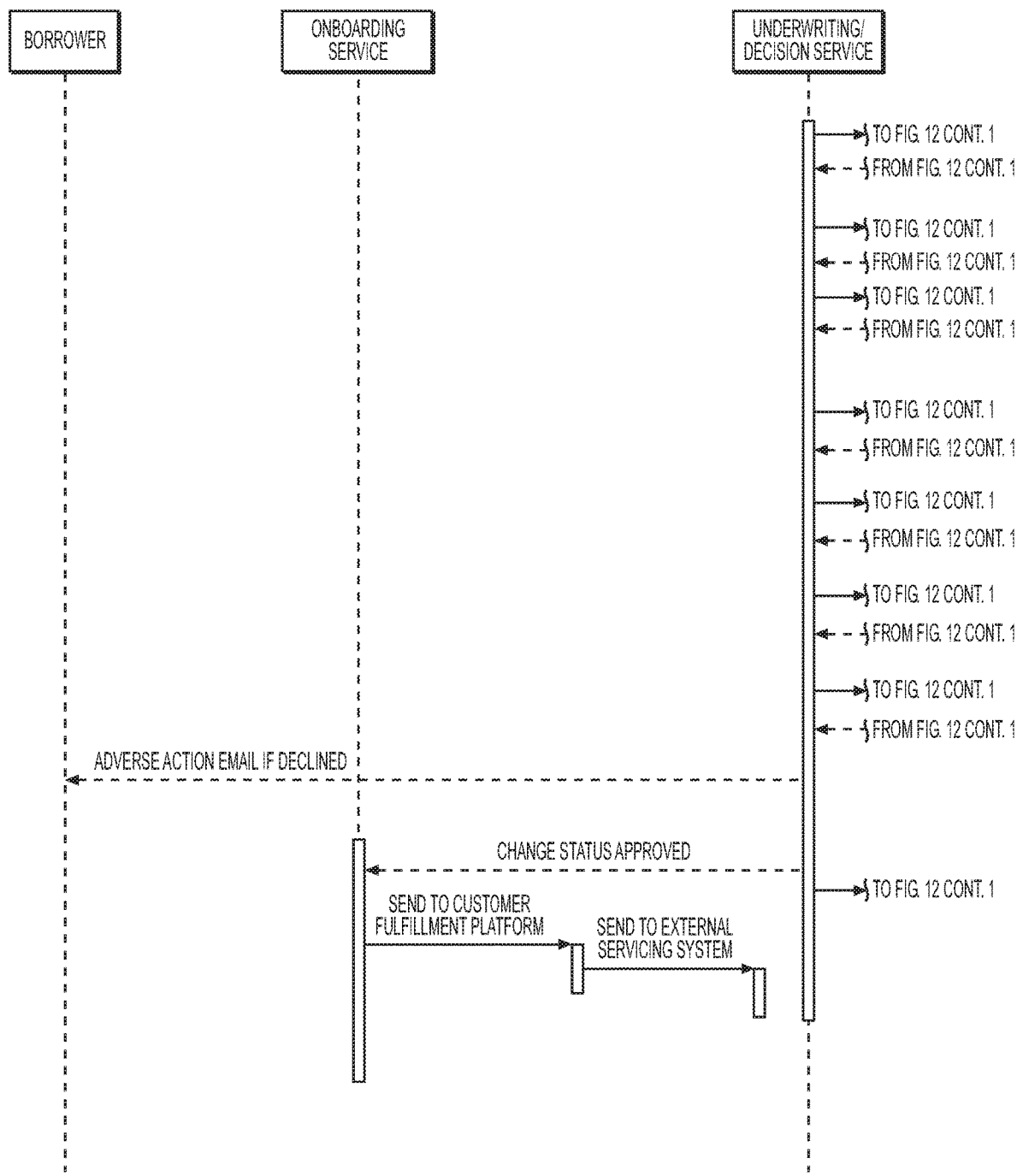
FIG. 12 is a detailed process flow for final underwriting.
Figure 13:
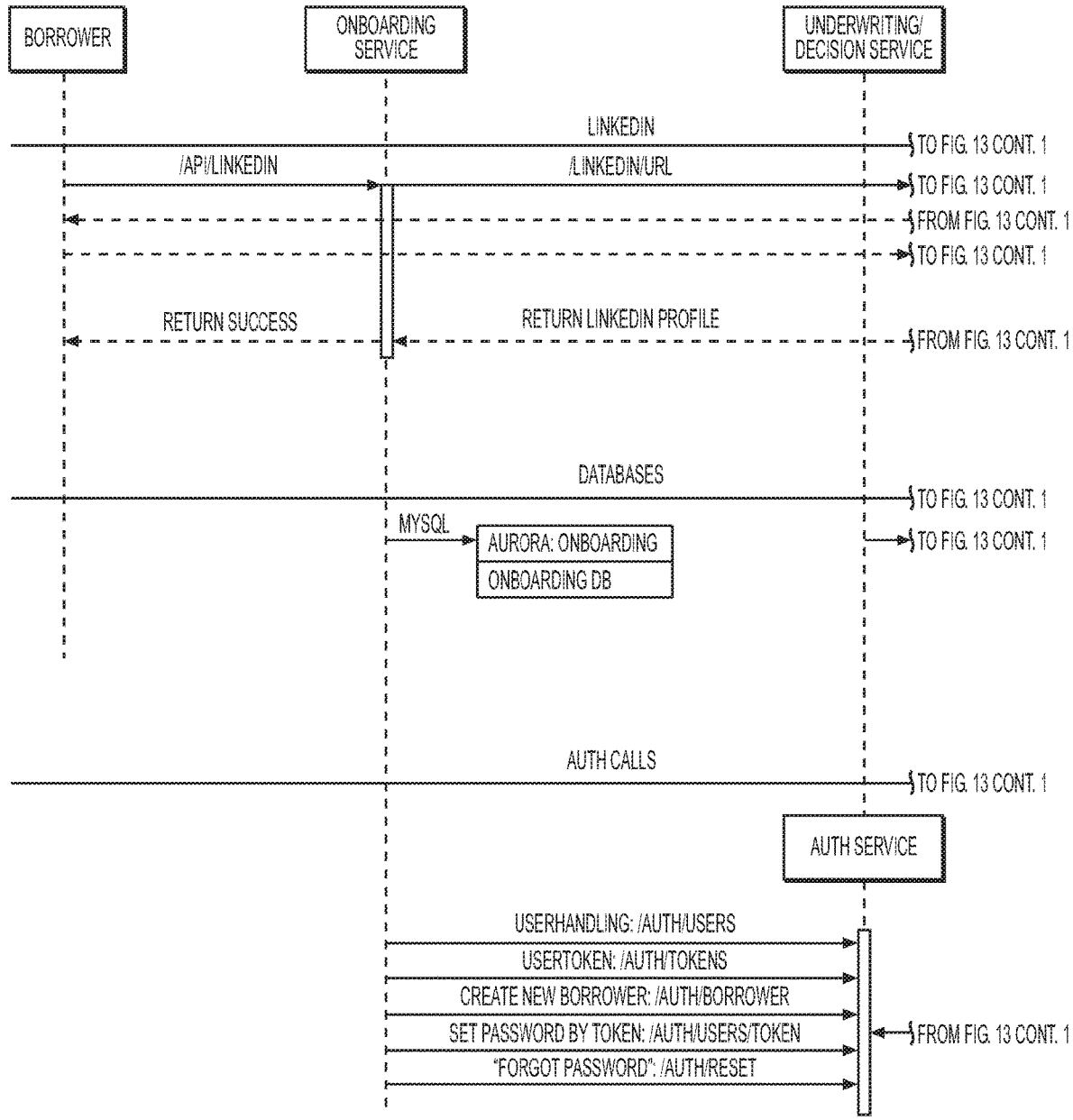
FIG. 13 is a detailed process flow diagram for additional service connections.
Figure 13:
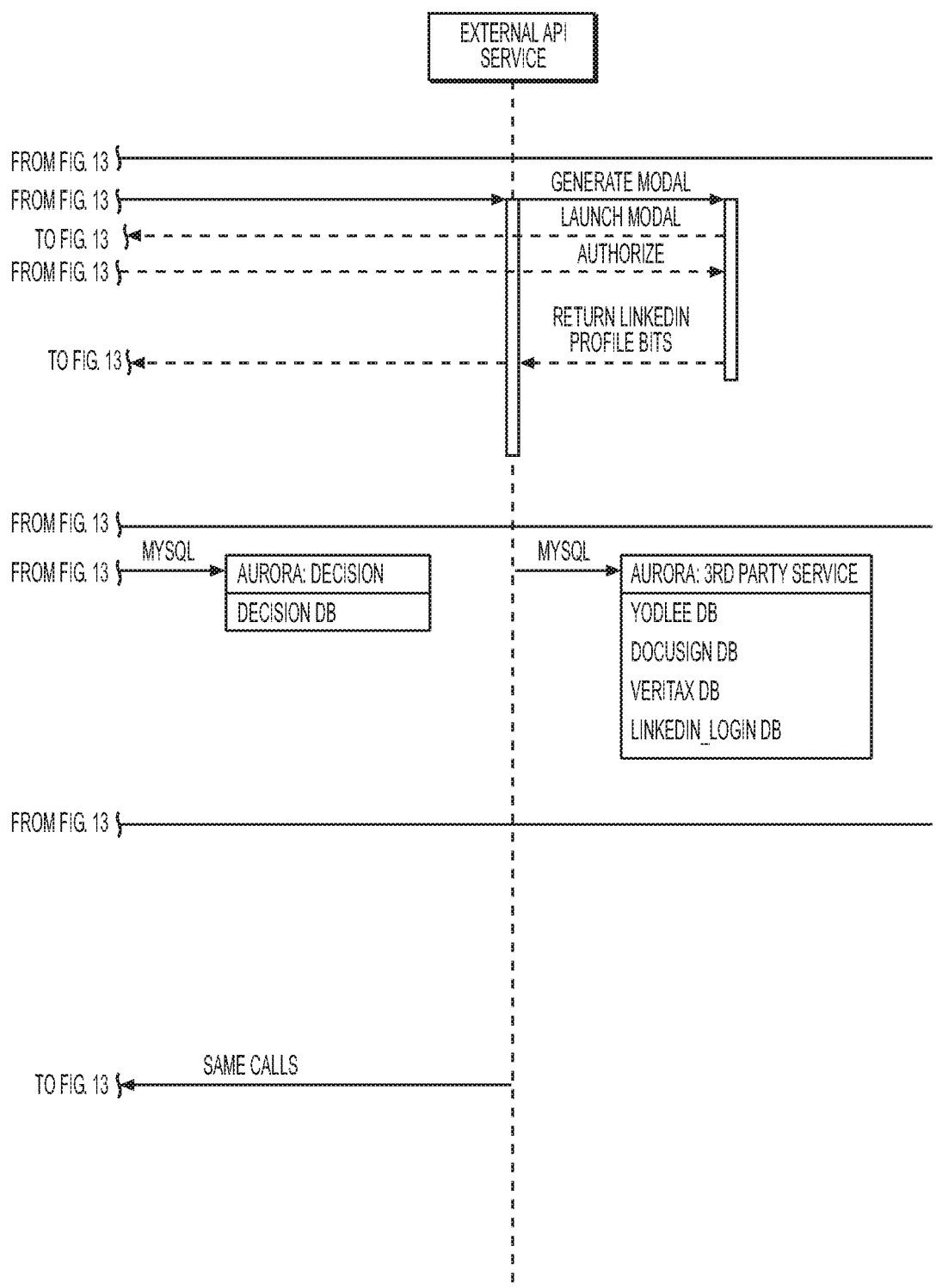

Sales dashboard provides real-time unique visitor data to include:
Location of customer (city, state) with IP address
Instant reporting of pages customer is viewing, or has visited while chatting After hours capability to capture name, e-mail, and message for sales Detailed Process Flow and Steps Referring to FIGS. 11, 12 and 13, exemplary flow and detailed process steps are shown. In particular, FIGS. 11, 12 and 13 comprise a detailed interaction diagram that depicts the interactions between various services in one embodiment. Services can have public API's, which are accessible outside of the system with an appropriate user login, private API's, which are only accessible within the system and require an API token, or both:

Onboarding Borrower Experience

Figure 14:
FIG. 14 is a screen shot of a borrower's user interface for account creation and selecting an affinity group.

An onboarding borrower experience is described with reference to FIGS. 14 through 19. FIG. 14 shows basic borrower account creation and requesting of affinity group information from the borrower.

Figure 16:
FIG. 16 is a second screen shot in a series of screens for prequalifying for a business loan.

FIGS. 15 through 17 show an example of a borrower experience for prequalifying for a loan.

Figure 19:
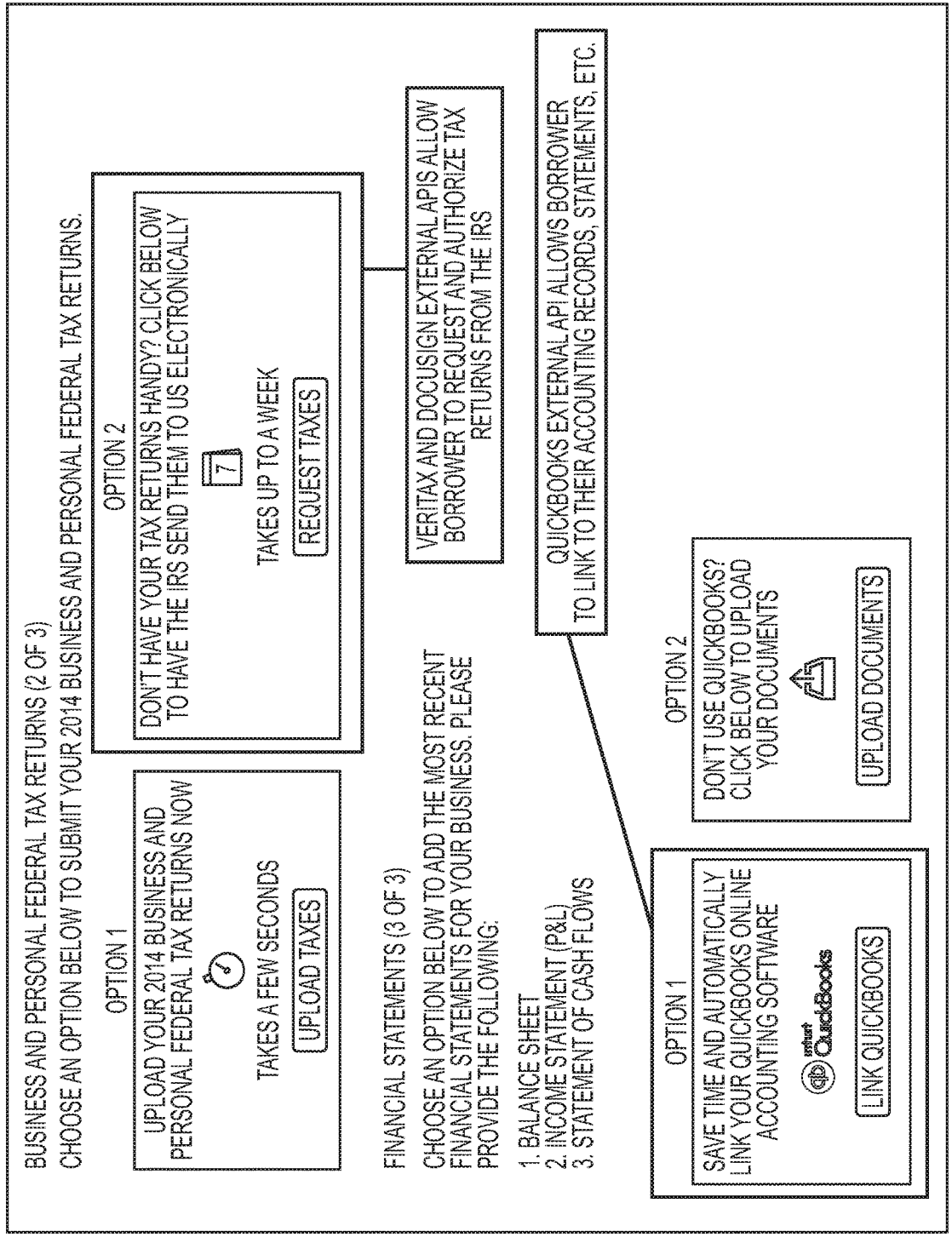
FIG. 19 is a second screen shot of a user interface for borrower approval and submission of supporting documentation.

FIGS. 18 and 19 show an example of a borrower approval process in the exemplary on-line lending system.

API References

The following section includes an exemplary listing of exemplary API calls that each service may support with a brief description, the necessary authentication (P denotes a private authentication token needed while a U denotes a user authenticated token), and the specific permissions needed for user based calls where necessary.

Onboarding API:

The following table lists the exemplary REST API calls available for the Onboarding service.

| METHOD | URL | DESCRIPTION | AUTH. | PERMISSIONS |
|---|---|---|---|---|
| GET | /api/applications/[app_id] | return application fields | P | |
| GET | /api/applications/[app_id]/business_name | return application business name | P | |
| POST | /api/partners/borrowers | add preapproved application | P | |
| PUT | /api/pplications/[app_id]/fields/status | set application status | P | |
| PUT | /api/ping | test connectivity | U | |
| GET | /api/version | return database version | | |
| GET | /api/zipcodes/ | find matching city, state, lat, lon for zipcode | U | borrow, edit |
| POST | /api/borrowers | add new borrower and application | | |
| DELETE | /api/borrowers | sign out | U | |
| POST | /api/applications | start new application | U | borrow |
| POST | /api/qualify/[app_id] | prequalify | U | owner |
| POST | /api/apply/[app_id] | ready to start underwriting | U | owner |
| GET | /api/applications/newest | return most recent application | U | borrow |
| GET | /api/applications/[app_id]/step[123] | return data for specified step | U | owner, edit |
| GET | /api/applications/[app_id]/?field={field name} | get basic application data | U | owner, edit |
| PUT | /api/applications/[app_id] | set application field(s) | U | owner, edit |
| POST | /api/applications/[app_id]/copy | duplicate an existing application | U | copy |
| GET | /api/applications/[app_id]/checklist | return a progress checklist for an application | U | owner, edit |
| GET | /api/applications/[app_id]/export | export application data and documents | U | export |
| POST | /api/applications/[app_id]/addmultipleguarantors | enable multiple guarantor mode for an application | U | addguarantors |
| GET | /api/applications/[app_id]/fields/[name] | get application field | U | owner, edit |
| PUT | /api/applications/[app_id]/fields/[name] | set application field | U | owner, edit |
| POST | /api/applications/[app_id]/files/[tax\|bank\|dd214\|other] | add file to application | U | owner |
| DELETE | /api/applications/[app_id]/files/[file_id] | delete an application file | U | owner |
| GET | /api/applications/[app_id]/files/[file_id] | get an application file | U | owner |
| POST | /api/applications/[app_id]/pitchfiles/[docs\|images\|video\|logo] | add an application pitch file | U | owner, edit |
| DELETE | /api/applications/[app_id]/pitchfiles/[file_id] | delete an application pitch file | U | owner, edit |
| GET | /api/applications/[app_id]/pitchfiles/[file_id] | get an application pitch file | U | owner, edit |
| GET | /api/applications/[app_id]/pitchfiles/[file_id]/download | download an applicaton pitch file | U | owner, edit |
| GET | /api/applications/[app_id]/urls | return a set of REST urls for an application | U | borrow, edit |
| POST | /api/users/resetpassword | send reset password email | | |
| GET | /api/users/resetpassword | get reset password dialog | | |
| PUT | /api/users/resetpassword | reset password | | |
| PUT | /api/user/password | change password | U | |
| PUT | /api/users/token | partner api set password call | | |
| POST | /api/linkedin | generate linkedin register url | | |
| PUT | /api/linkedin | generate linkedin login url | | |

-continued

| METHOD | URL | DESCRIPTION | AUTH. | PERMISSIONS |
|---|---|---|---|---|
| GET | /api/linkedin | handle linkedin dialog callback | | |

Underwriting/Decision API Service:
The following table lists exemplary REST API calls available for the Decision Service:

| METHOD | URL | DESCRIPTION | AUTH. | PERMISSIONS |
|---|---|---|---|---|
| POST | /v1/decision | add and prequalify new application | P | |
| POST | /decisions | add and prequalify new application | P | |
| POST | /v1/decisions2 | add new application | P | |
| PUT | /v1/decisions/[app_id]/fields/ | update field value | P | |
| POST | /v1/decisions2/[app_id]/qualify | prequalify existing application | P | |
| PUT | /v1/decision/[app_id]/has_tax/ [business\|personal] | update tax indicator for application | P | |
| PUT | /v1/decisions/[app_id]/ update_request_id | change request_id for existing application | P | |

External API Service:
The following table lists exemplary REST API calls available for the External API service:

| METHOD | URL | DESCRIPTION | AUTH. | PERMISSIONS |
|---|---|---|---|---|
| GET | /party/[app_id]/data | return a collection of 3rd party application data | P | |
| GET | /veritax/[app_id]/ [tax\|business\|personal] | return available tax data | P | |
| POST | /linkedin/url | generate linkedin url | P | |
| GET | /linkedin/url | handle linkedin authentication callback | P | |
| GET | /docusign/[app_id]/tax | get tax document to sign | U | borrow |
| GET | /docusign/[app_id]/[hash] | callback for signed document | U | borrow |
| POST | /yodlee/login | sign in to yodlee | U | borrow |
| GET | /yodlee/sites?search_string=[search] | search for matching sites | U | borrow |
| GET | /yodlee/site_login_form/[site_id] | return login form details | U | borrow |
| POST | /yodlee/[app_id]/site_login | start or continue bank login | U | borrow |

Authorization API Service:
The following table lists exemplary REST API calls available for the AUTH service:

| METHOD | URL | DESCRIPTION | AUTH. | PERMISSIONS |
|---|---|---|---|---|
| GET | /auth/ping | test connectivity | P | |
| PUT | /auth/tokens | authenticate user by token | P | |
| POST | /auth/tokens | login user | P | |
| POST | /auth/users | add new user | P | |
| GET | /auth/users/ | checks if user exists | P | |
| POST | /auth/users/reset | resets user | P | |
| GET | /auth/users/reset | verifies user reset | P | |
| PUT | /auth/users/reset | resets password with new password | P | |
| POST | /auth/reset | resets password with new password | P | |
| PUT | /auth/users/ | check current password then change with new password | P | |
| PUT | /auth/users/token | check password set with token then change to new password | P | |

-continued

| METHOD | URL | DESCRIPTION | AUTH. | PERMISSIONS |
|---|---|---|---|---|
| POST | /auth/borrower | add new borrower account | P | |
| POST | /auth/borrower_partner | adds new borrower from partner | P | |

Affinity Investment Methods and Systems

One of the embodiments is directed to systems and methods for Investor-directed online lending using affinity—social loyalty between individuals with shared traits—methods and systems. Particularly in peer-to-peer lending systems affinity investment methods and systems improve performance and customer satisfaction. Auto invest methods and systems can be combined with affinity investment to further improve performance of lending and loans as well as improve customer satisfaction. Both the burrowers and the lenders are able to benefit from affinity based lending. The intermediary benefits from less delinquent loans to manage and, if the intermediary is investing alongside, increased returns on affinity based loans.

In affinity systems and methods, the lender or facilitator nurtures affinity groups between Borrowers and Investors. These are connections or a touchstone that business Borrowers and Investors have in common. Affinity systems and methods have many benefits: (1) Lower cost of capital—investors are willing to offer lower interest rates to a business owned by someone with a common touchstone. (2) Decreased risk for investors—borrowers are more likely to repay a loan from people they have a connection with and may be more like themselves than a loan from a big anonymous bank. (3) Lower customer acquisition and marketing costs—members of an affinity group will be likely to refer others to become borrowers and investors. The affinity lending system creates a win-win for both investors and borrowers.

There are many different types or categories of affinity groups which may be used with the affinity lending system, one example is U.S. military veterans.

Referring to FIG. 20, in this example, there are dozens of veteran-focused organizations including those shown with logos below that fall into this category of affinity group, such as the American Legion, Iraq and Afghanistan Veterans of America, VeteransList.US, and National Veteran Owned Business Association. These symbols, affinity symbols, are used by the lending system throughout the various web pages or application created pages for borrowers and investors.

When a business borrower applies for a loan, the affinity system verifies the borrower's status as belonging to a particular group or class, in this case veteran status. Thereafter, where appropriate the website indicates veteran status on information made available to all investors as shown below. In some embodiments, the affinity system will also note the affinity group that the investor members or borrowers belong to with an electronic symbol such as badges, logos or other identifying marks. For example, military service symbols or veteran organizational symbols may be placed on the borrower's or investor's web presence or web page in the affinity loan system.

The lending system stores the affinity symbols or logos as well as the criteria for qualifying or checking credentials for admission to such an affinity group. In this manner, the system can check or verify membership by an individual in a particular affinity group. In some embodiments, borrowers wishing to belong or be affiliated with a particular affinity group must qualify or be verified prior to being admitted to the affinity group.

Figure 21:
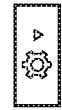
FIG. 21 is an example of an owner web page or generated screen display for an owner accepting bids or orders in a lending system.

Referring to FIG. 21 an owner webpage for a borrower accepting bids or orders is shown. The owner webpage includes portions displaying services (or product information), contact information and affinity symbol.

Both investor and borrowers are attracted to organizations supporting groups in which they are members. An affinity system helps attract and maintain lenders and borrowers as it builds a connected community. Borrowers and lenders will join because, for example, they are veterans themselves, or specifically interested in backing veteran-owned businesses. Investors will bid lower interest rates for affinity groups that they wish to support. Other affinity groups include: alumni groups, geographic areas, industry areas, professions, associations, sports affiliations and others.

The lending system can be arranged to display all borrowers in a particular affinity group or all open auction or funding periods within an affinity group. In this way, investors can target their loans to certain affinity groups. Various incentives can be provided to both borrowers and investors for investing within an affinity group. These incentives can range from coupons to financial incentives. For example, if a Harvard alumna investor supports a Harvard alumna borrower, the investor may obtain a coupon for the product or services provided by the business. In another example, the intermediary provides a discount on administrative costs associated with the affinity based loan.

Auto Invest Systems and Methods

One of the embodiments uses auto invest systems and methods to allow lenders to invest in certain borrowers based on a set of investment variables. The auto invest tool operates on-line through a website or portal. The auto invest feature may be combined with other features and embodiments described.

Accredited investors (also known as "Regulation D" investors) can either electronically place fractional loan purchase orders or bids or orders individually on individual loan auction or funding periods, or use the Auto Invest tool to automatically place orders or bids or orders on each loan auction or funding period that meets the investor's criteria. Auto Invest has two parts, an investment criteria part and a bid amount and rate part.

With regard to the investment criteria part, investors select criteria to determine the loan auction or funding periods for which they would like to have Auto Invest bids or orders placed. In one embodiment, the criteria available are loan risk criteria, as shown below. In other embodiments, the investors have additional criteria they can choose from, including geographic areas, business borrower industry type, loan size, loan term, and membership in affinity groups (Veterans, alumni networks, geography, industry, etc.).

Auto invest is performed in multiple ways, for example by risk tolerance and investing with or alongside another investor. The system allows the investor to choose auto investing and to adjust for risk tolerance or risk allocation and adjust for expected net return. An example of selecting risk allocation and expected return is shown in FIG. 22. In this embodiment, three options are provided (low, high and all) to investors on a display screen. Many variations of the exact method shown are possible. For example, the system may allow an investor simply to select desired return rate or range of rates. Alternatively, the system may allow for selection of estimated loses. For ease and convenience of use, in one embodiment, low, medium, high and all risk allocations can be made available as four separate options.

With regard to the second part, bid amount and rate variables, once investors have chosen investment criteria, investors are invited to choose the bid amount and rate for each on-line Auto Invest bid. In the example shown below, investors can choose the bid amount as either a fixed dollar amount (for example in $25 increments) or as a percentage of the full loan amount. Many other bid amounts or arrangement are available or possible in an auto invest system. Also, in this example, investors can choose the bid rate, for example as a fixed percentage at, above, or below a lender or facilitator's bid, as shown below:

Set Your Bid Amount:
The average System loan amount is currently $21,800
Percentage of Loan desired to Auto Invest ____% OR
Dollar Amount of auto invest desired: $50.00
What's the difference between the two above?
Your Average Bid Amount: $50
Set Your Desired Loan Rate:
The average System rate is currently 21%
Your desired Rate 20.25%
Your Average Bid Rate: 20.75%
The following additional information about the lending system can be provided to the investor as shown below:
Some More Details about Auto Invest
+Auto Invest automatically bids or orders as new loans that meet your investment criteria are added to the System market place. Bids or orders are made at the start of these auction or funding periods.
+As with any bid on the lending system, bids or orders placed through Auto Invest are final and cannot be cancelled.
+As long as you have sufficient funds to meet your investment criteria, Auto Invest will make bids or orders.
+You can turn Off Auto Invest at any time.
+Interest rates, Estimated Loss Rates (ELRs), and System's credit policy are subject to change. Such changes could impact your investing decisions and criteria. Information on System will always be current and accurate, and will reflect any updates to such rates and ELRs.
+In order to use Auto Invest, your total account value must be at least $1,000.
+System reserves the right to terminate any individual investor's access to Auto Invest at any time.
+Auto Invest will not make bids or orders in auction or funding periods where you already have a current, active bid or order.
+Auto Invest will generally not make bids or orders in auction or funding periods that are closed unless special selections are made in your auto invest profile.
+Auto Invest FAQs
1—What is the range of interest rates for loans of similar risk levels within the current System portfolio.
2—What is ELR? Estimated Loss Rate (ELR) is the current default rate for similar loans. It is based off a number of factors such as historical data of similar assets, expected performance, and market conditions. The interest rate should compensate for the expected loss rate that the business carries together with any expected volatility in returns.
3—What is the Sytem's Loans That Meet Your Criteria? It represents the percentage of loans within the current System portfolio that meet your investment risk criteria.
4—What is Expected Net Return? It is an estimate based off similar investments in the System portfolio, which calculates return on a daily basis, namely all received interest and fee payment less loses, dollar weighted by invested funds. Funds are considered invested when a borrower accepts their loan. Only realized, not expected interest, fees, and losses are included in the calculation. The rate is then annualized, assuming the portfolio maintains the historical performance of a similar portfolio throughout the year.

FIG. 22 is an example of a full screen webpage view for auto invest system and method for risk criteria selection and bid a rate amounts on one screen. Additionally, on this exemplary screen, the investor may choose to invest in closed loans by choosing closed loans among the investors criteria. In this example, the intermediary has held positions on various closed loans. These intermediary positions on closed loans are available for later sale when new investors or existing investors show an interest in existing loans. By holding loan positions in closed loans the intermediary may make this immediately available to an investor that has come into money, changed investment strategy or is new to the system. The intermediary simply "sells" a portion of the intermediary's position on a "closed" loan to the requesting investor.

In some embodiments, the auto invest feature is combined with the affinity feature. Specifically, in those embodiments, the auto invest feature includes the selection of one or more affinity groups to target the automatic investment. Thus, in addition to selecting risk criteria, bid amount and rate, ELR, the investor may choose to target loans to one or more affinity groups selected from the affinity groups available in the lending system. For example, an investor who is a veteran may choose to auto invest in certain affinity groups related to veterans or a subset of veterans. For this embodiment, the auto invest selections of FIG. 22 would have an additional question, "Do you want to select certain affinity groups for your auto invest?" followed by "Set your affinity groups." A pull-down menu of affinity groups may be used for investors convenience. In some embodiments, this affinity selection is similar to the selection by the borrower of affinity groups as shown in FIG. 14. However, in most embodiments, the investor is not required to qualify as a member of an affinity group in order to invest in an affinity group. Each of the affinity groups selected by the investor in the auto invest feature will then be targeted for the investor.

Non-Payment Dependent Note (NPDN) Embodiment

One of the embodiments is directed to systems and methods for Investor-directed online lending using a Non-Payment Dependent Note (NPDN) securities structure. NPDN is an advancement and improvement over use Payment Dependent Notes (PDN).

In various embodiments, the systems and methods of the Marketplace/P2P lending described include:
  Use of Retail Investor Non-Payment Dependent Notes (NPDNs) rather than Payment-Dependent Notes (PDNs).
  Rearranges the order and method of conducting the existing elements of a Marketplace/P2P offering, when compared to the order and method of existing Marketplace/P2P offerings.
  Decouples the underlying loan made by the Intermediary from the NPDN issued by the Intermediary to Investors who expressed an interest in a particular loan.

Allows Investors to direct their funds to a Borrower of their election, while reducing or shielding that Investor from the credit risk of the underlying loan.

Allows Intermediaries to offer discretionary monetary and non-monetary compensation to Investors based on the performance of loans elected by the Investors. This discretionary compensation, as structured herein, provides Investors with the compensation and feedback loop of a correlated loan-Note structure, while still maintaining the use of NPDNs and an uncorrelated loan-Note structure.

Arranges the above elements in various efficient process orders.

Previous system and methods that existed prior to the NPDN are described in this application. These loan types are available for use with the various systems, methods and features described in the various embodiments. In the following paragraphs, Payment Dependent Notes (PDNs) are used to help describe Non-Payment Dependent Notes (NPDNs)

Figure 23:
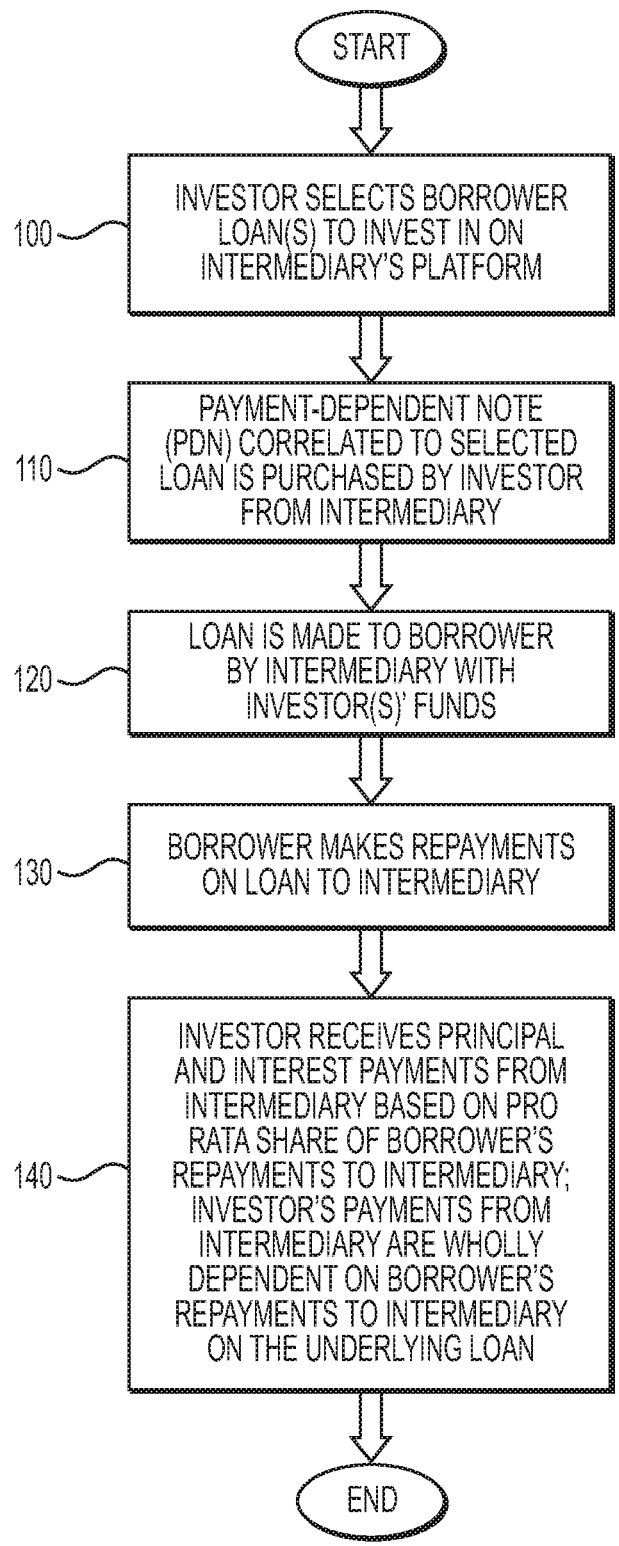
FIG. 23 is a prior art flow diagram for a payment dependent note (PDN) facilitated by an intermediary.

FIG. 23 illustrates the previous system and method of conducting Marketplace/P2P lending that existed prior to NPDN. Such system and methods in use prior to the NPDN invention used a payment dependent note (PDN) structure. The process is as follows:

[100] First, the Investor selects Borrower loans to invest in on the Intermediary's platform.

[110] Second, a Payment Dependent Note (PDN) correlated to the selected loan is issued to the Investor by the Intermediary. PDN's are a debt security regulated by state or federal securities regulators. PDNs are limited, special obligations of the Intermediary. Terms of the PDNs can vary, but PDNs are typically coterminous with the term of the underlying correlated loan.

[120] Third, a loan is made to the Borrower by the Intermediary using the funds provided by the Investor (s). Some intermediaries are direct lenders and make loans directly to the Borrower. Other intermediaries have a partner bank make the loan to the Borrower, and the Intermediary then purchases the loan from the bank. Loans are typically backed by funding from several Investors—both retail Investors and institutional Investors. Funding from multiple Investors is combined by the Intermediary to make the loan or purchase the loan made by a bank.

[130] Fourth, the Borrower makes repayments on the loan to the Intermediary. This is done according to the terms of the loan agreement or promissory note.

[140] Fifth, the Investor receives principal and interest payments from the Intermediary based on the Investor's pro rata share of the Borrower's repayments to the Intermediary. Importantly, the Investor's payments from the Intermediary are wholly dependent on the Borrower's repayments to the Intermediary on the underlying loan.

Figure 24:
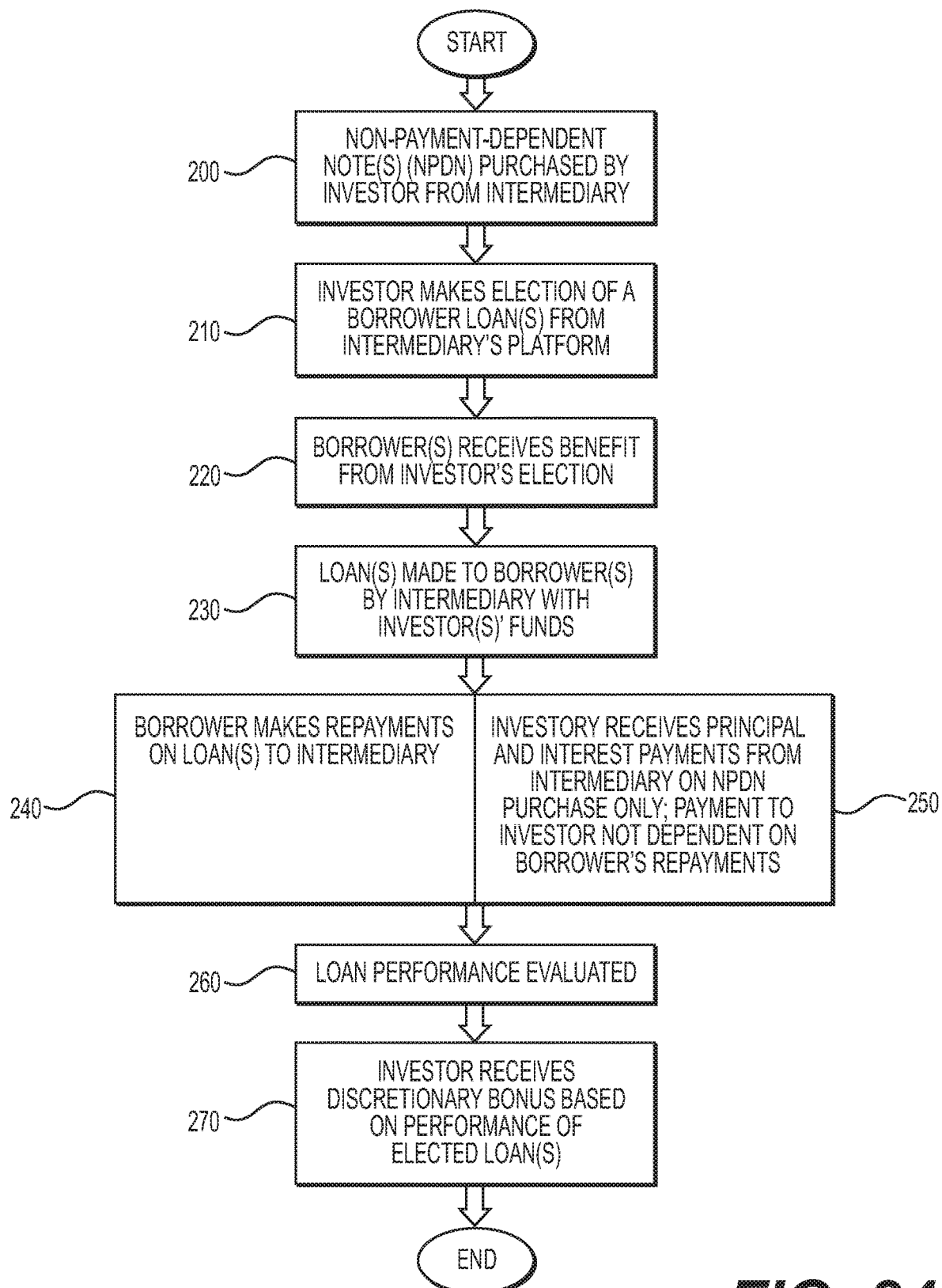
FIG. 24 is a flow diagram for an exemplary NPDN system using an intermediary.

FIG. 24 shows systems and methods of the NPDN embodiments. The NPDN embodiments include a number of steps as shown. Some of these steps are optional to an NPDN system and method.

More specifically, FIG. 24 illustrates the new NPDN system and method for conducting Investor-directed online lending using a non-payment dependent note (NPDN) structure with optional steps. The illustrated process is as follows:

Referring to step 200, first, Non-Payment-Dependent Note(s) (NPDN) are purchased by the Investor from the Intermediary. NPDNs are debt securities regulated by state or federal securities regulators. Unlike the limited recourse terms of payment dependent notes (PDNs), NPDNs are fully recourse debt obligations of the Intermediary itself. Terms of the NPDNs vary. Unlike payment dependent notes, NPDNs are correlated to the risks of the Intermediary and are not correlated to the risks of any particular underlying loan or set of loans. The Intermediary's obligations to the NPDN holder are determined by the terms of the NPDN. Other types of note structures may be used with the Marketplace/P2P lending systems and methods described. In some embodiments, notes which reduce the risks associated with underlying loan or sets of loans are used. In other embodiments proportionate or partial risk based notes are used, Partial Payment Dependent Notes (PPDN). In other embodiments, the risk is substantially or completely eliminated. In yet other embodiments, notes are mixed. For example, PDN, NPDN and/or PPDN may be used in various combinations and permutations.

Referring to step 210, second, the Investor makes an election of a Borrower loan or group of Borrower loans from the loan choices offered to the Investor by the Intermediary on the Intermediary's electronic loan platform. An Investor makes an election by electronically clicking on the preferred loan(s), electronically indicating a preference or approval of the particular loan(s), otherwise indicating approval for a particular loan(s), and/or indicating an amount of funding that the Investor wishes to allocate to support the particular loan(s). Other methods and systems of choosing a Borrower loan or group of loans may be used. The selections may be made from various electronic devices on any of a number of computerized platforms.

Referring to step 220, third, the Borrower receives a benefit from the Investor's election of the Borrower's loan. This benefit may be monetary or non-monetary. The Borrower receives this benefit because the Investor indicated a preference for the Borrower's loan on the Intermediary's electronic loan platform. Most commonly, but not necessarily, the more elections or indications of preference that the Borrower's loan receives from Investors the greater the reward to the Borrower. The Borrowers benefits may be, for example, reduction in origination costs, reduced interest rate, reduction in principle amount, awards programs, public recognition, advertising, prominence of loan featured on website, free or reduced price on third party services or products, free or reduced prices on services or products of: advertisers on the lending website, Investors and/or other Borrowers on the lending system (e.g. web services, dry cleaners, pizza, etc.), coupons, giveaways, etc.

Referring to step, 230, fourth, a loan is made to the Borrower by the Intermediary using the funds provided by the Investor(s). In some embodiments, intermediaries are direct lenders and make loans directly to the Borrowers. In other embodiments, intermediaries have a partner bank make the loan to the Borrowers, and the Intermediary then purchases the loan from the bank. Loans are typically backed by funding from several Investors—both retail Investors and institutional Investors. In many instances, funding from multiple Investors is combined by the Intermediary to make or purchase the loan. Various types of loans and loan arrangements are possible.

Fifth, events [240] and [250] happen in parallel, although not necessarily simultaneously or conterminously. [240] The Borrower makes repayments on the loan to the Intermediary. This is done according to the terms of the loan agreement or promissory note between the Borrower and the Intermediary. [250] The Investor receives principal and interest payments from the Intermediary based on the terms of the Non-Payment-Dependent Note (NPDN) purchase only (or other note). Unlike repayments based on PDNs, repayments of NPDNs from the Intermediary to the Investor do not depend on the Borrower's repayments on the selected loan to the Intermediary. With an NPDN, the Borrower may default on the loan, and the Investor would still receive repayments from the Intermediary. Repayments to the Investor are based on the terms of the NPDN (or other note or mix of notes) between the Investor and the Intermediary.

Referring to step 260, sixth, the performance of the loan(s) elected by the Investor is evaluated by the Intermediary. Loan evaluation is based on one of more of the following: loan interest rate, timely and full repayment, loan payoff, late payments, loan delinquencies, loan charge-offs, loan profitability to the lender, and other relevant factors. Loan performance may also be evaluated in reference to the actual versus expected risk of the loan, in reference to other loans in the Intermediary's portfolio, and/or in reference to the performance of similar loans made by other lenders other than the Intermediary.

Referring to step 270, seventh, the Investor may receive a guaranteed or a discretionary bonus from the Intermediary for the performance of the loans elected by the Investor. The bonuses may be monetary or non-monetary. The bonuses may be based on the performance of loans selected by the Investor, by a group of loans selected by the Investor, or by all loans selected by the Investor. The discretionary bonus may or may not be granted by the Intermediary. An algorithm examining factors related to the loans is used to calculate Investors' record or success for determining discretionary bonus. Factors or criteria are evaluated by the algorithm, for example, timeliness loan payments, interest rates paid on loans, risk reward on selected loans, etc. Examples of bonuses to Investors include for example one or more of the following: access to premier or premium loans, first look option on new loans, right of first refusal on new loans, voting on selection of new loans, ability to bump other investors on loans, reduction in origination cost or rate to a particular borrower, increased interest rate on Investor note, increase principle amount of note, awards programs, public recognition as superior investor, advertising, selection of loans featured on website, free or reduced price on third party services or products, coupons, giveaways, promotional materials, free or reduced prices on services or products of: advertisers on the lending website, Investors and/or other Borrowers on the lending system (e.g. web services, dry cleaners, pizza, etc.), etc.

More specifically, FIG. 24 illustrates the new NPDN system and method for conducting Investor-directed online lending using a non-payment dependent note (NPDN) structure with optional steps. Marketplace/P2P lending prior to the NPDN invention described herein involved the investor receiving Payment Dependent Notes (PDNs) from the Intermediary and exposed Investors directly to the credit risk of the underlying loans selected by the investor, whereas the present invention allows Investors to receive Non-Payment Dependent Notes (NPDNs) from the Intermediary, thus shielding Investors from the direct credit risk of the underlying loans, permitting Investors to receive fixed principal and interest repayments from the Intermediary, making Investors eligible for a discretionary bonus granted to the Investor by the Intermediary depending on the performance of the elected loans, and preserving the ability for Investors to elect the loans the Investor wishes his investment to fund.

Regulation a Investors (Non-Accredited Investors).

The systems and methods to offer regulation A investors investment opportunities via a website as described. With this system neighborhood investors, main street investors, can invest in neighborhood business, main street business. This more direct type of investment creates greater likelihood that both the business and investors will succeed. Those interested in investing will be directed to a landing page on the website that allows for entry of basic information such as first name, last name and an email address. Other basic information may be gathered in this stage of the process such as geographic information, address, profession and the like.

In one embodiment, those individuals who complete the landing page or provide the first webpage information will be contacted by a member of the lender staff, where they will be invited to fill out a detailed investor application on a paper copy sent by email. Once submitted, applications will be reviewed by the lender investor relations team as well as the lender legal team for OFAC, AML, and other suitability criteria. In other embodiments, this initial screening is completed completely electronically on-line.

Those investors who are approved by the lender will be invited to send funds by check via US mail to the lender. In other embodiments, funds are wired, paid by credit card or other financial transaction. Once funds are received and cleared via the bank, the investors will, as facilitated by the lender, be invested in a note earning a fixed interest rate. This investor note will be an NPDN note. Following the transaction, the investor may take advantage of the various digital features available to the investor including affinity methods and systems.

In some embodiments, the NPDN system and method is fully automated and digital from end to end between the lender/facilitator and the investor. All information and transactions are handled on-line and digitally. In these embodiments, the funds are received digitally and the NPDN notes are issued digitally and on-line.

Regulation D Investors (Accredited Investors).

The NPDN systems and methods are also available to accredited Regulation D investors. The system and methods are available through a website, examples follow. Certain parts of the system and methods or product are limited to accredited investors as defined by Rule 506(*b*) of Regulation D. In one embodiment, those interested in investing are directed to a website to apply online electronically. A first web page or landing page is used requesting first name, last name email address and creation of a private account with a password. Once created, the accredited investor uses the same account and password for all future interactions. The landing page also requests the investor agree to the terms and conditions, privacy policy and investor membership agreement. In most embodiments if the investor does not agree to the terms, no account is created.

Those who fill out the landing page information then proceed to additional online application forms. Once submitted, applications will be reviewed by the lender/facilitator investor relations team as well as the legal team for OFAC, AML, and other suitability criteria. This processing is generally performed by an intermediary between the investors and borrowers.

Those investors who are approved are able to fund their account electronically by ACH bank transfer or by wire transfer. In some embodiments, credit card and other forms of investment are also available. Investors can also fund their account from a Self-Directed IRA. In some embodiments, a transfer funds page is used. This webpage may provide history of funding transactions or a transfer history. In some embodiments, tabs are available for each type of transfer or deposit with instructions and fill-in forms for each. Typical banking information is required for fund transfers.

The transfer funds webpage may include other information about the investors account such as whether auto invest has been activated, whether funds are left unallocated or not invested, notices, correspondence, etc.

Referring to FIG. 25, investors can view all business loans currently being funded on an investment screen display or web page.

FIG. 25 depicts a series of tiles on a webpage visible to investors. In this embodiment, the webpage has a frame, a common frame that is found on each page the investor (or borrower) views. The frame maintains some visual constants and provides basic information to the viewer. In this case, the investor frame includes for example, auto invest feature on-or-off, account funding, link to further fund the account). Additional information such as the investors affinity groups may also be shown in the frame.

Referring to FIG. 25, each tile on this particular webpage represents a company seeking investments. In this embodiment, the name of the company, amount of funding being sought, the term of the loan, expected interest rate of the loan, amount raised, percent funded, time left on auction or funding period and some information about the borrower is provided. Symbols are used within the tiles to signify affiliations and allow for affinity investment opportunities as described elsewhere.

Investors can click in the "funding tile" of a particular business to learn more information about the business. For example, the investor may view a summary of financial data prepared by the lender/facilitator credit team, or read a "pitch" written by the business owner. Armed with this information, investors then decide whether to bid a dollar amount and an interest rate on an auction or funding period for a loan to a small business.

More particularly, in one embodiment when the investor clicks in an auction or funding period tile a series of webpages appear with information about the company requesting funds (borrower).

Figure 26:
FIG. 26 is an exemplary screen display of a borrower's financial profile.

Referring generally to FIG. 26, in some embodiments, the first company information screen will include a series of tabs across the top of the page showing the available pages for that particular borrowing company. Selecting a tab will provide the investor with additional information about the borrower below the tab bar. The tabs will remain on the webpage for the investor to navigate from tab to tab and garner all desired information about the borrower.

Referring to FIG. 26, pages containing information on basic business info are available. For example, in FIG. 26, the Biz Info tab (2nd tab from the lest) leads to a Biz Info page which may include for example two or more of: Name of business, age of business, type of business (service or product), address, picture of geographic map/satellite location, industry, number of employees, NAICS code, and links to business website, LinkedIn, Facebook page, Twitter account, etc. Further, documentation or supporting information may be linked to show the source of the data shown on the Biz Info page.

Referring to FIG. 26, the third tab from the left is the pitch tab. Selecting the pitch tab provides the investor with a webpage posting the company's short pitch requesting funds (webpage not shown). This pitch webpage, again, includes the tab bar. The information posted on the pitch webpage includes for example, "US Veteran-Owned Services Business seeking loan. Bazaco Inc. is a 10+ year old US Veteran-Owned services business based in Purcellville, Va.; currently has a 3-5 employees, with an annual revenue of $1M-$10M. Richard Bazaco is requesting a $17,500 loan for a 1 year term."

FIG. 26 is a depiction of the Financials information webpage for viewing by the potential investor. The financials information webpage includes the tab bar previously described and some specific general and specific financial information about the specific borrower. For example, the financial page may include historical financials, annual revenue, current cash balance, average monthly inflows, average monthly outflows, average monthly net cash flow, cash flow trends, current debt, average cash margin, intermediary loan coverage, estimate loss rate percentage, credit available, guarantor annual income and/or assets etc. Supporting documentation for the information on the page is linked to the page with active link locations.

FIG. 27, is a full screen view of a bid tab display. If upon examination of the view in FIG. 27, the investor would like to place a bid or order in the loan auction or funding period, the investor can do so via the bid-auction or funding period screen or web page. From the bid tab view, an investor can place a bid or begin the process to place a bid.

The bid tab view shows a tile with information on a particular borrower. If this borrower is actively looking for funding than the investor may bid from this view. Various information about the borrower's auction or funding period can be seen from the bid tab view. In particular, the time left in the auction or funding period (e.g., to bid on the loan) as well as the active bids or orders, their amounts and interest rates. Also, information on the intermediary's activities are provided on this tabular view both for transparency and to guide and assure the investor about the credibility of the loan and rates. In this example, StreetShares is used as the exemplary intermediary entity. FIG. 27 shows that the intermediary and its partners have pre-funded $11,736 at an interest rate of 22.75% for 67.0% of the loan. Thus, leaving only 33% to individual Marketplace/P2P investors in the auction or funding period process. Armed with the information on the bid tabular view, including expected loss rate (ELR), and the intermediary pre-funding amount as well as rate, investors have a general idea of the rate and risk associated with this loan. Investors can use this information to bid against each other for one of more portions of this loan.

In FIG. 27, the bids or orders of the investors are shown in a table format including for example, date and time of bid, name of bidder, amount of bid and interest rate. Bidders may watch this data live during the auction or funding period and add, delete or change their bids or orders. In this instance, the bids or orders are listed in interest rate order, which is generally how the lending system chooses the auction or funding period winners. In order to make a new bid more likely to be closed upon, the bidder should bid a rate that is less than some of the existing bids or orders. More specifically, less than the rate of some of the existing bids or orders which are expecting to be winners. In this instance with a desired loan amount of $17,500 and $11,736 being pre-funded, only $5,764 (17,500–11,736) will be funded by investors. Therefore, a winning bidder will be within the lowest interest rate bids or orders up to the amount of $5,764. Since further funds are not needed to fulfill the loan, other bids or orders will generally be rejected by the lending system.

In many embodiments, the lender may bid a specific dollar amount and a rate for the auction or funding period. Bidders may place multiple bids or orders of varying amounts of dollars and varying interest rates. In the FIG. 27 example, the bidder JGuide has placed multiple bids or orders of $100, some at different interest rates.

As can be discerned from FIG. 27, the active bids or orders are rank ordered by the system and displayed in order of preference. In this example, assuming the bid is otherwise qualified, interest rate is first order of ranking used by the system. In many embodiments, the second ranking is based on either amount of bid, larger bids or orders getting priority, or followed by earliest time of bid. Thus, two bids or orders of the same rate can be preference ranked and displayed. Other variations of preference ranking may be used in the auction or funding period system. The display will accordingly display the bids or orders in the rank order used by the particular lending system.

In many embodiments, auction or funding periods have a fixed duration and the loan amount is pre-determined by the lender/facilitator credit team. For example, in some embodiments, investors can place bids or orders in units of $25 and choose the interest rate they would like to earn for their bid within two decimal digits. The minimum unit size of the bid can vary (e.g., $10, $20, $25, $30, $50, $100, $250, $500, $1,000, etc.) and the available interest rates can be restricted (e.g., whole numbers, quarter rates, eighths, tenths, two digit decimal, three digit decimal, etc.). In some embodiments, when time expires on the auction or funding period, the bids or orders with lowest interest rates that fully fund the loan amount are the winning bids or orders. If the business borrower accepts the resulting loan offer, the investors are issued Member Payment Dependent Notes (MPDNs) for their bids or orders.

In some embodiments, loan auction or funding periods may frequently end with funding from bids or orders offered by 20-30 different investors, each investor with bids or orders of a different amount and interest rate. Once the loan is fully funded, the remaining lenders bids or orders are generally ignored as lost bids or orders. In some embodiments, the lowest rate bids or orders are accepted over the higher rates until a time deadline is reached. Also, all other factors being equal, the earlier entered bids or orders are accepted over the later entered bids or orders. Various rules and variations on the auction or funding period and bidding process may be used in different embodiments.

In one embodiment, the system or method's platform automatically combines the various bids or orders for a loan into a borrower's blended rate as part of the single loan offer made to the business borrower. The blended rate allows the loan to appear to the borrower as a single loan with a single scheduled payment and a single interest rate.

If the borrower accepts the loan, in the embodiment using the blended rate, the borrower make a single payment to the lender, which the platform then automatically separates into payments issued for each investor, MPDN associated with the loan. In some embodiments including auction or funding periods, in which investors may make multiple bids or orders, a calculation for repayment of each winning bid is made.

Thus, in a competitive embodiment with an auction or funding period, different investors compete on interest rates to fund a loan. Each investor can bid in dollar increments, for example from minimum dollar increments of $25 for each loan. Each investor can bid an interest rate for the dollar increment. In some embodiments, an investor can enter multiple bids or orders into the platform.

All the investor bids or orders for a particular loan get combined to make a loan with one rate and one payment for the borrower. The borrower views this as a single loan. But each investor gets a predetermined payment which is based upon their bid amount and the bid rate. As long as the borrower is making timely pre-set payments off an amortization schedule, and remains exactly on schedule, the payments can be split back to the investors based on each investor's bid and the amount can be calculated upfront.

But this methodology breaks down if the customer deviates from the preset payment schedules e.g. prepays early, skips payments, make partial payments, charges off, etc. In an ideal world, the lending system would re-calculate bid level amortization tables for each investor's loan every time a borrower deviates from the payment schedule. This process would be extremely complex, and would require considerable system and platform work and is not possible with certain platforms. It is also difficult for many investors to understand and very difficult for investors to calculate on their own.

To resolve this problem in one embodiment of the lending system, an algorithm and technology that enables the system to allocate the payments across all different payment schedules or payment back scenarios from the borrower is used.

In many embodiments of the lending system, on a pre-set schedule (e.g. weekly, bi-weekly, monthly) a borrower is required to make a loan payment that is calculated upfront based on the loan amount, term of the loan and the blended rate of all the auction or funding period bid rates. The loan payment consists of principal that is the money lent to the borrower and the interest payment on the principal. The loan is a fixed interest amortizing loan and the principal portion of the payment increases over time and the interest portion of the payment decreases over time. The repayment schedules for the borrowers are set up-front, at the time the loan is taken, often using amortization tables or amortization type calculations. In some embodiments, fixed loan re-payment schedules are set.

For many loans, each loan consists of multiple investors and each investor can have a unique bid amount (or funded amount if entire bid amount was not utilized) and rate. Since the lending system receives one payment from the borrower, it uses a disbursement algorithm. The disbursement algorithm assists with calculating the amount of payment to each involved investor or note holder. Various disbursement algorithms are possible. In one embodiment, the system uses the following algorithm and methodology to disburse the payments to the individual investors holding the note.

For each payment for every loan, each investor gets a percentage of the principal amount paid by the borrower. In one embodiment, this principal payment factor is calculated as a percentage of the total loan amount that is funded by the investor. For example, if the total loan amount is $10,000 with a blended interest rate of 10% for a 1 year loan and the loan has 3 investors that have the following attributes:

Investor 1: bid amount—$1000 and bid rate—8%.
Investor 2: bid amount—$8000 and bid rate—10%
Investor 3: bid amount—$1000 and bid rate—12%

Then, for example, Investor 1's principal factor is his percentage of the principal of the loan or in this case 10% —$1000/($1000+$8000+$1000)=10%. Similarly, Investor 2's percentage of the principal is 80% (8,000/10,000) and Investor 3's principal percentage is 10% (1,000/10,000).

The sum of these investor's principal factors, percentage of principal, is 100%. If the intermediary is also an investor on a particular loan, its loaned amount is included in the principal percentage and other calculations.

In addition to receiving a percentage of principal paid on every loan, for each payment of each loan every investor gets a percentage of the interest amount paid by the borrower. In one embodiment, this interest factor is calculated as a percentage of the total interest over the life of the loan that the investor is due based on the investor's bid amount and the bid rate. Given interest is a combination of amount and rate it, in this example the interest factor is calculated as (investor's bid amount×investor's bid rate)/(sum of all bid amounts×bid rates). For example, for the 3 investors above, Investor 1's interest factor is ($1000×8%)/($1000×8%+$8000×10%+$1000×12%)=8% and similarly for Investor 2 the interest factor is 80% and Investor 3 is 12%. The sum of these investor's interest factors is 100%.

Thus, in most embodiments, for every payment made by a borrower, each investor receives a principal payment based upon the investor's principal factor and an interest payment based upon the investor's interest factor. Interest only payment loans as well as situations in which the intermediary holds the principal amount would have interest only disbursements to investors with lump sum principal payments. Since it can be pre-calculated, the investor knows in advance the principal percentage and interest percentage of each payment to expect as a disbursement.

Also in some embodiments, the platform or service provider charges a servicing fee, for example 1% or 2% of all the payments to the investors. Servicing fees may range from zero to as much as 25%. Typical service fees are in the range of 0.25%, 0.5%, 0.75%, 1.0%, 1.5%, 2.0%, 2.5% etc. In some embodiments, the intermediary service fee is deducted from each payment made by the borrower. This service fee is automatically deducted from the payments due to the investors as calculated above. For example, if the borrower pays a first payment of $201.7 with the principal of $182.5 and interest of $19.2 then the payments will be disbursed as follows:

Investor 1: Principal 10%×$182.5=$18.3 and Interest of 8%×$19.2=$1.5. Total payment after 1% servicing fee=99%×($18.25+$1.5)=$19.6

Investor 2: Principal 80%×$182.5=$146.0 and Interest of 80%×$19.2=$15.3. Total payment after 1% servicing fee=99%×($146+$15.3)=$159.8

Investor 3: Principal 10%×$182.5=$18.3 and Interest of 12%×$19.2=$2.3. Total payment after 1% servicing fee=99%×($18.3+$2.3)=$20.4

In this embodiment, regardless of what the borrower pays and when the borrower pays, each investor's principal factor and interest factor are not changed for a given loan. This allows distribution of loan payments to be quickly and easily calculated. The two factors, principal factor and interest factor control all payouts or disbursements regardless of how much or when received. In some embodiments, any other payments such as late fees and delinquencies are similarly disbursed by percentage to investors using the two factors.

The methodology of the distribution and allocation of payment system described which can be applied across all payment schedules, late payments, make-up payments, recoveries, etc. The distribution and allocation of payment system may be implemented as a single methodology system or a hybrid. The use of the two factors, principal and interest, in the algorithm and methodology for allocating and distributing payments is easy to implement, robust, defensible and there is no need for any reconciliation. The systematic approach to allocating and distributing payments has many advantages. It is particular useful, efficient and powerful for an intermediary attempting to administrate a complex lending system with a number of investors.

FIG. 28 shows an exemplary user interface or dashboard for use with various embodiments described. In some embodiments, investor members can track their portfolio on the website via a dashboard view, as shown in FIG. 28, entitled My StreetShares and My Notes.

In FIG. 28, the My StreetShares screen or view provides a snapshot of the investor's current portfolio and portfolio performance. The My StreetShares View includes the total account value, net annualized returns, total income received, Total Notes outstanding, active bids or orders and rejected bids or orders. In this example, the total account value tile includes total invested, total in active bid, money available for bid and notification of pending auction or funding periods available. The net annualized returns category or tile also provides information on average interest rate, total seasoned return rate, adjusted net annualized returns, and a link to information on how returns are calculated. The total income received tile includes information on interest, service fees, late fees, realized losses and principal returned. The total notes value tile provides an active link to a listing of the notes as well as a line showing notes paid in full. Further, the total notes tile shows a calculation of the total note value including current notes, late or delinquent notes, impairment applied, and charged off In FIG. 28, the view displays a table of active bids or orders, in other words, those bids or orders still pending. The table includes the date and time of the bid, business name of the potential borrower, the amount of the bid, the interest rate of the bid, and total amount of money in the bid process.

Figure 29:
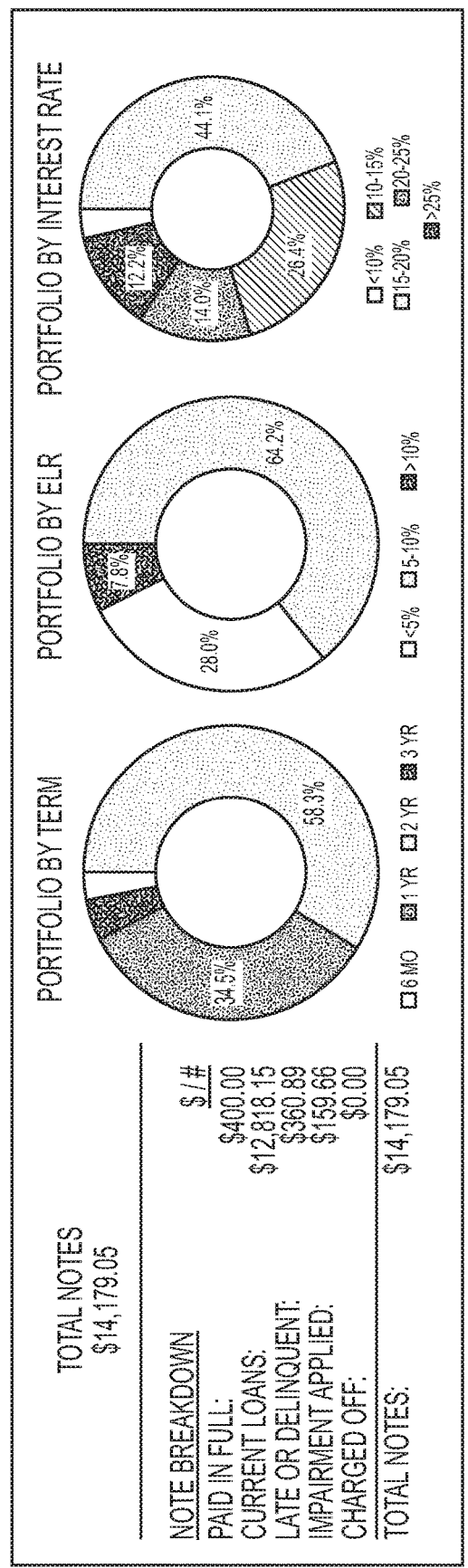
FIG. 29 is an exemplary dashboard view of an investors account activity in pie charts and listing invested bids or orders.

FIG. 29 shows a user interface screen called My Notes. My Notes provides investors a dashboard view of the portfolio performance on the upper portion of the screen or view. The lower portion of the My Notes view is a table of invested bids or orders.

The My Notes dashboard view provides donut charts (e.g., pie charts, bar charts and the like may be used) which provide visual data on the portfolio term, portfolio estimated loss rate and portfolio interest rate allowing the viewer to better understand and analyze the data. Also, in the FIG. 29 example, information similar to the total notes tile is displayed in the upper portion.

Referring to FIG. 29, the lower portion of the My Notes screen provides a table with invested bids or orders whose columns can be changed or controlled. The top row shows a summary or totals for the columns. In particular, the amount invested, interest paid, and total paid is summed and displayed. In the format shown, the affinity symbol is in the left most column followed by name of borrower, amount, rate, interest paid, principal paid, total paid, status and accept date. Other columns may be used to summarize the invested notes and the columns shown may be rearranged. From this view, it is easy for the investor to review investments in any particular affinity group he has invested.

Through a user interface on the lending system, investors can also access digital copies of their Member Payment Dependent Notes (MPDNs), monthly statements and/or reports for their portfolio, investor member agreement, bank account info and annual tax forms as well as website agreements such as Privacy policy, Terms and Conditions, and Risk Statement. In one embodiment, these types of documents are accessible through a "My Docs" web page or screen.

In many embodiments, the MPDNs are also available listed in a table along with ID number, status (e.g., in repayment, delinquent, paid, etc.), business name of borrower, amount of payment, interest rate on note, aggregate principal balance, original balance, issue date of note, initial maturity date of note and type of note (e.g., MPDN, NPDN, hybrid, other). In some embodiments, an active link is incorporated in a listing of the notes to allow investors direct access to copies of the notes. An example of a user interface web page, My Docs webpage, includes for example the following items:

MY DOCS
+Privacy Policy
+Terms & Conditions
+Risk Statement
+Verify Bank Account
+Investor Member Agreement
+2015 December Investment Report
+2015 November Investment Report
+2015 October Investment Report
+2015 September Investment Report
+2015 August Investment Report
+2015 July Investment Report
+2015 June Investment Report
+Tax Year 2015: Consolidated Form 1099

| MEMBER PAYMENT DEPENDENT NOTE(S) | | | | | | | |
|---|---|---|---|---|---|---|---|
| id | Status | Business Name | Amount | Rate % | Aggregate Principal | Issue Date | Initial Maturity Date | MPDN |
| 25067 | In repayment | Spatial Terra, LLC | $300 | 17.25 | $15000 | 2016 Feb. 11 | 2017 Feb. 17 | MPDN |
| 24364 | In repayment | The Dreeszen Agency, Inc. | $300 | 6.50 | $5000 | 2016 Feb. 08 | 2017 Aug. 16 | MPDN |
| 24366 | In repayment | IronmanPipe and Steel LLC | $300 | 14.00 | $10000 | 2016 Feb. 7 | 2016 May 17 | MPDN |
| 23997 | In repayment | Axion LLC | $300 | 17.00 | $35000 | 2016 Jan. 29 | 2017 Aug. 8 | MPDN |

Above is a table of an investors member dependent notes along with their status amount rate, principal, issue date, maturity date and other info. In some embodiments, the table includes both MPDN and NPDN notes within the same table. The investor can access a list or table of the Member Payment Dependent Notes as well as Non-Payment Dependent Notes whenever desired through the lending system user interface.

If the investor would like to withdraw funds from their lender account, they can do so via a Transfer Funds webpage or API screen. Funds may be withdrawn by various electronic transfer methods and/or by check.

The embodiments include: hardware and software elements of the Marketplace/P2P lending system, the unique order of elements in the Marketplace/P2P lending system, affinity investing hardware and software, use of symbols and logos in affinity investment systems and methods, auto investing hardware and software, using the unique elements and method steps of Non-Payment Dependent Notes (NPDNs) in alternative lending, using the elements of NPDNs specifically for Marketplace/P2P lending and combinations of the above.

Figure 30:
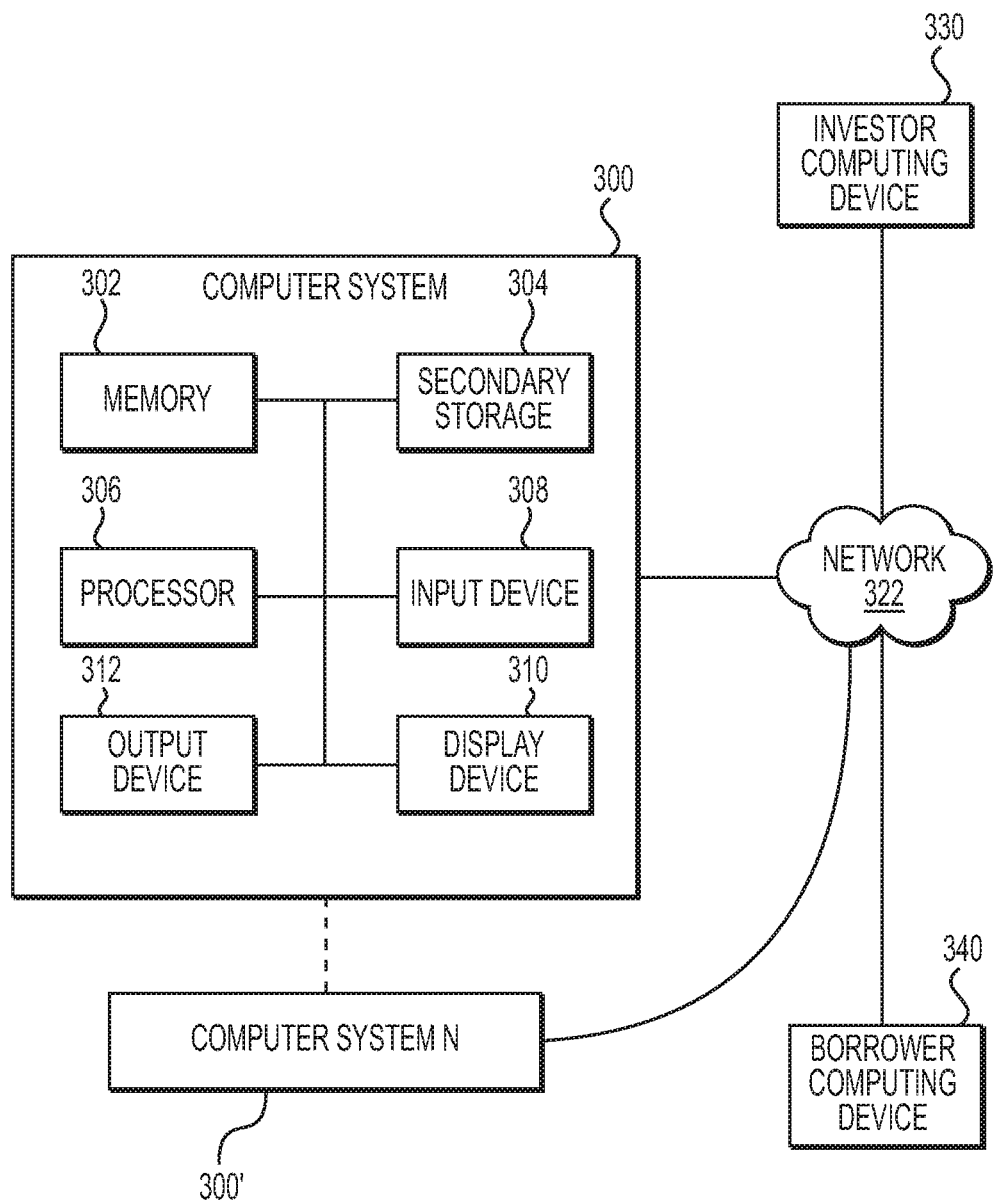
FIG. 30 is an exemplary hardware diagram for a lending system.

FIG. 30 is a block diagram showing an exemplary lending system. More particularly, FIG. 30 shows a block diagram illustrating exemplary hardware components for implementing embodiments of a system including an on-line lending system implementing the various embodiments and features discussed above. These hardware components are used to implement peer-to-peer lending with or without affinity systems and with or without auto invest systems. These hardware implementations may be used with the embodiment of NPDN shown in FIG. 24 and methods thereof. Also, any combination of affinity systems and methods, auto invest systems and methods, as well as PDN and NPDN may be implemented with the various hardware configurations shown and described. Various combinations of features and systems may be implemented using the hardware configuration shown and variations of the hardware configuration.

A borrower computing device 340 and Investor computing device 330 are shown as part of the on-line lending system. Numerous of the borrower 340 and computing devices 330 may be used with the on-line lending system. Each computing device is connected in some way to a network and is capable of communicating with the on-line lending systems computer system 300. Computer system 300, including client-servers combining multiple computer systems, or other computer systems similarly configured, may include and execute one or more subsystem components to perform functions described herein, including steps of methods and processes described above with reference to the various figures including FIG. 24. Computer system 300 may connect with network 322, e.g., Internet, or other network, to receive inquires, obtain data, and transmit information and incentives as described above.

Computer system 300 typically includes a memory 302, a secondary storage device 304, and a processor 306. Computer system 300 may also include a plurality of processors 306 and be configured as a plurality of, e.g., bladed servers, or other known server configurations. Computer system 300 may also include an input device 308, a display device 310, and an output device 312. Memory 302 may include RAM or similar types of memory, and it may store one or more applications for execution by processor 306. Secondary storage device 304 may include a hard disk drive, floppy disk drive, CD-ROM drive, or other types of non-volatile data storage. Processor 306 executes the application(s), such as subsystem components, which are stored in memory 302 or secondary storage 304 or received from the Internet or other network 322. The processing by processor 306 may be implemented in software, such as software modules, for execution by computers or other machines. These applications preferably include instructions executable to perform the system and subsystem component (or application) functions and methods described above and illustrated above including in the figures such as in FIG. 24. Software for each of the embodiments and features of the on-line lending system described above (such as affinity, auto invest, NPDN, dashboard, payout systems (include incentive and various payout methods), combinations, etc.) may be stored in memory 302 or 304 and executed by computers.

The applications preferably provide graphical user interfaces (GUIs) through which users may view and interact with subsystem components (or application in mobile device). These interactions allow users to invest or borrow money in accordance with the methods above including that shown in FIG. 24. Electronic symbols, logos and the like can be rendered for the affinity system described above by the GUI and/or on webpages using the computer systems 300.

Computer system 300 may store one or more database structures in secondary storage 304, for example, for storing and maintaining databases, and other information necessary to perform the above-described methods. Alternatively, such databases may be in storage devices separate from subsystem components. Databases of borrowers, investors, affinity groups and financial transactions may be stored and maintained on these computer systems 300 and memory systems 302 and 304.

Also, as noted, processor 306 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system (or application).

Input device 308 may include any device for entering information into computer system 300, such as a touch-screen, keyboard, mouse, cursor-control device, gesture controlled touch-screen, microphone, digital camera, video recorder or camcorder. The input device 308 may be used to enter information into GUIs or other presented video and/or audio during performance of the methods described above. Display device 310 may include any type of device for presenting visual information such as, for example, a computer monitor, curved or flat-screen display (or mobile device screen), 3D or virtual reality display system. The display device 310 may display the GUIs and/or output from sub-system components (or application). Output device 312 may include any type of device for presenting a hard copy of information, such as a printer, and other types of output devices include speakers or any device for providing information in audio form.

Examples of computer system 300 include dedicated server computers, such as bladed servers, personal computers, laptop computers, notebook computers, palm top computers, network computers, tablets, mobile devices, or any processor-controlled device capable of executing a web browser, GUI, API, virtual reality or other type of programs and applications for interacting with the system. API's and other types of applications may be used with the system, particularly if mobile devices are being used.

Although only one computer system 300 is shown in detail, system and method embodiments described herein may use multiple computer system 300' or servers as necessary or desired to support the users and may also use back-up or redundant servers to prevent network downtime in the event of a failure of a particular server. In addition, although computer system 300 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, e.g. computer system 300, 300', to perform a particular method, such as methods described above with reference to FIG. 24.

Included in the embodiments are computerized systems, comprising:

a Non-Payment-Dependent Note (NPDN) debt security issued directly from an Intermediary to an Investor, an electronic election by an Investor of a Borrower's loan or group of Borrower loans from the loan choices offered to the Investor by the Intermediary, a related benefit to the Borrower because of the Investor's election of the Borrower's loan determined by a benefit algorithm, a loan made to the Borrower by the Intermediary using the funds provided by the Investor, a repayment to an Investor of only the principal and interest payments from the Intermediary based on the terms of the Non-Payment-Dependent Note (NPDN) purchase, an evaluation of loan performance of those loans elected by the Investor conducted by the Intermediary using a computer executing a computer algorithm, and a bonus from the Intermediary to the Investor based on the evaluation of loan performance elected by the Investor.

Also included in the embodiments are computerized methods, comprising:

making an offer of a Non-Payment-Dependent Note (NPDN) debt security issued directly from an Intermediary to an Investor, either previous to or simultaneous with, displaying, on a display device, the election options by an Investor of a Borrower's loan or group of Borrower loans from the loan choices offered to the Investor by the Intermediary, followed by, granting of a related benefit, to the Borrower because of the Investor's election of the Borrower's loan, followed by, granting of a loan to the Borrower by the Intermediary using the funds provided by the Investor, followed by, granting of repayments to an Investor of only the principal and interest payments from the Intermediary based on the terms of the Non-Payment-Dependent Note (NPDN) purchase followed by, making of an evaluative judgement of loan performance specifically those only those loans elected by the Investor conducted by the Intermediary, using a computer and a computer algorithm followed by, granting of a discretionary bonus from the Intermediary to the Investor based the performance of the loans elected by the Investor.

The computerized systems of the embodiments may include:

Non Payment-Dependent Notes (NPDNs) that are not payment dependent on any underlying loan issued on an Intermediary's online lending platform, NPDNs that are the general debt obligations of the Intermediary, NPDNs issued by computer-generated program and electronically signed by the Intermediary in favor of the Investor, NPDNs stored electronically by the Intermediary in accordance with custodial arrangements in place by the Intermediary, a method for Investors to view their NPDNs through an electronic online dashboard on the Intermediary's website, NPDNs that are callable, redeemable, and prepayable at any time by the Intermediary at par value plus any accrued but unpaid interest.

With regard to on-line Marketplace/Peer-to-Peer (P2P) lending systems, including specific Non-Payment Dependent Note (NPDN) subsystem, they may include:

an electronic interface by which Marketplace/P2P lending Non-Payment Dependent Notes (NPDNs) are provided for Investors to purchase directly from the Intermediary, an electronic interface by which Investors purchase Marketplace/P2P NPDNs that earn the designated annual rate guaranteed by the Intermediary, an electronic interface by which Marketplace/P2P NPDNs are held on an Intermediary's platform in electronic form in a computer storage device and not listed on any securities exchange, nor in physical or paper form, an electronic interface by which Marketplace/P2P NPDN investors can accessing their notes using a graphical user interface including a "My Notes" tab in an Investor's account, a computerized procedure by which the Intermediary will use the proceeds of NPDN purchases by Investors primarily to fund Borrower loans through the Intermediary platform but also for general corporate purposes, including the costs of making the NPDN offering, a computer algorithm for the sourcing and use of funding to enable the Intermediary to make Borrower loans via an automated online system that collectively uses: funds from NPDN sales to Investors, Intermediary's direct funding account, funds from institutional capital providers, and funds from accredited Investors. Member payment dependent notes as well as non-payment dependent notes are used in combination in some embodiments.

The systems described may be implemented using non-transitory mediums. For example, a Marketplace/P2P system may operate from a non-transitory medium comprising instructions for:

making an offer of a Non-Payment-Dependent Note (NPDN) debt security issued directly from an Intermediary to an Investor;

displaying, on a display device, the election options by an Investor of a Borrower's loan or group of Borrower loans from the loan choices offered to the Investor by the Intermediary;

granting of a related benefit, to the Borrower because of the Investor's election of the Borrower's loan;

granting of a loan to the Borrower by the Intermediary using the funds provided by the Investor;

granting of repayments to an Investor of only the principal and interest payments from the Intermediary based on the terms of the Non-Payment-Dependent Note (NPDN) purchase;

making of an evaluative judgement of loan performance specifically those only those loans elected by the Investor conducted by the Intermediary, using a computer and a computer algorithm; and granting of a discretionary bonus from the Intermediary to the Investor based the performance of the loans elected by the Investor.

An on-line peer to peer lending system that includes reducing risk is described above. An example of such an on-line peer to peer lending system may include reduced risk investor notes comprising:

an investor computing device, wherein information about a risk reduced note are displayed and borrower loans are displayed for selection;

a borrower's computing device, wherein data about a borrower's loan is entered;

a server system for processing data on risk reduced notes, borrower loans, and investor performance, wherein a first algorithm is executed to determine investor performance and provide an investor bonus and a second algorithm is executed to determine a benefit to the borrower;

memory, connected to the server system, for storing data on risk reduced notes and borrower loans; and a network connecting the investor computing device, borrower computing device, server system and memory.

Affinity investment systems and methods for on-line lending including peer-to-peer lending are implemented on networks and computer systems as described above. In some embodiments, these affinity investment systems and methods use electronic symbols on webpages to represent an affinity group for on-line lending including peer-to-peer lending substantially as shown and described wherein individuals or businesses are associated with affinity groups having electronic symbols.

Affinity investment systems and methods are implemented using electronic symbols on webpages or displays to represent an affinity group in order to increase a borrower's sense of loyalty and obligation to repay the loan in order to provide borrowers with lower interest rates and provide investors with lower risk of loan failure (or ELR) in on-line Marketplace lending and peer-to-peer lending substantially as shown and described. Also, in the affinity systems, individuals and/or businesses are associated with affinity groups having electronic symbols for display.

Auto invest systems and methods for on-line investment including peer-to-peer auto investment systems are shown and described as being implemented on networks and computer systems. User interfaces are associated with the auto invest systems and methods. In some embodiments, auto invest systems and methods for on-line investment including peer-to-peer investment systems have investment criteria selection for risk, rate and/or bid amounts substantially as shown and described. In many embodiments, the auto invest systems and methods further comprise user interfaces and reports of investments made.

The embodiments include an on-line peer-to-peer lending system with auction or funding period bidding and automatic payment distribution to investors. Some of these systems comprise, a processor and a memory configured to: calculate a principal factor and an interest factor for each winning investor bid and configured to automatically distribute loan payments to individual investors using the principal factor and the interest factor for individual investment bids or orders. In most embodiments, the principal factor and the interest factor are fixed for the duration or life of a loan. Both payment dependent notes as well as non-payment dependent notes may be used in combination with this auction or funding period bidding and automatic payment system.

The contemplated modifications and variations specifically mentioned above are considered to be within the spirit and scope of the present invention.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

What is claimed is:

1. An on-line lending system for Non-Payment Dependent Notes (NPDNs), comprising:
an electronic interface by which NPDNs are provided for investors to purchase directly from the intermediary;
an electronic interface by which investors purchase NPDNs that earn the designated interest rate set by the intermediary;
an electronic interface by which NPDNs are held on an intermediary's platform in electronic form in a computer storage device and not listed on any securities exchange, nor in physical or paper form;
an electronic interface by which NPDN investors can access their notes using a graphical user interface including a notes tab in an investor's account;
wherein the electronic interface for investors further comprises an investor computing device, wherein information about notes are displayed and borrower loans are displayed;
a computerized procedure by which the intermediary will use the proceeds of NPDN purchases by investors primarily to fund borrower loans through the intermediary platform but also for general corporate purposes, including the costs of making the NPDN offering;
a computer algorithm for the sourcing and use of funding to enable the intermediary to make borrower loans via an automated online system that collectively uses: funds from NPDN sales to investors, intermediary's direct funding account, funds from institutional capital providers, funds from intermediary's own balance sheet, and funds from accredited Investors;
a borrower's computing device, wherein data about a borrower's loan is entered;
a server system for use with the computerized procedure and computer algorithm and for processing data on notes, borrower loans, and investor performance, wherein an algorithm is executed to determine investor performance;
memory, connected to the server system, for storing data on notes and borrower loans; and
a network connecting the investor computing device, borrower computing device, server system and memory.

2. The on-line lending system of claim 1 further comprising an algorithm for calculating bonuses to investors holding NPDNs based upon loan performance of loans selected by investors to associate with NPDNs.

3. The on-line lending system of claim 1 further comprising an auto invest system for investor bidding on payment dependent notes and investor reports of investments made.

4. The on-line lending system of claim 1 further comprising an auto invest system for investor purchase of payment dependent notes or making a funding commitment on loans based on investor preselected criteria and investor reports of investments made.

5. The on-line lending system of claim 1 wherein the electronic interface by which NPDNs are provided for purchase further comprises offering investors payment dependent notes.

6. The on-line lending system of claim 1 wherein the electronic interface by which NPDNs are provided for purchase further comprises offering investors hybrid notes containing both NPDN and payment dependent note characteristics depending on conditions set by the intermediary.

7. The on-line lending system of claim 1 wherein the computer algorithm further provides for an interest rate and bonus based on the performance of the loans elected by the investor.

8. The on-line lending system of claim 1 further comprising an auto invest system wherein investors purchase NPDNs or make a funding commitment on loans based on investor preselected criteria and investor reports of investments made.

9. The on-line lending system of claim 1 further comprising an auto invest system wherein investor automatic investments are made through automatic purchase of notes or making of a funding commitment on loans based on investor preselected criteria, wherein the criteria are preselected on a user interface.

10. An on-line lending system for Non-Payment Dependent Notes (NPDNs), comprising:
an electronic interface by which NPDNs are provided for investors to purchase directly from the intermediary;
an electronic interface by which investors purchase NPDNs that earn the designated interest rate set by the intermediary;
an electronic interface by which NPDNs are held on an intermediary's platform in electronic form in a computer storage device and not listed on any securities exchange, nor in physical or paper form;
an electronic interface by which NPDN investors can access their notes using a graphical user interface including a notes tab in an investor's account;
wherein the electronic user interface for investors further comprises an investor computing device, wherein information about notes are displayed and borrower loans are displayed for selection;
a computerized procedure by which the intermediary will use the proceeds of NPDN purchases by investors primarily to fund borrower loans through the intermediary platform but also for general corporate purposes, including the costs of making the NPDN offering;
a computer algorithm for the sourcing and use of funding to enable the intermediary to make borrower loans via an automated online system that collectively uses: funds from NPDN sales to investors, intermediary's direct funding account, funds from institutional capital providers, funds from intermediary's own balance sheet, and funds from accredited Investors;
a borrower's computing device, wherein data about a borrower's loan is entered;
a server system for use with the computerized procedure and computer algorithm and for processing data on notes, borrower loans, and investor performance, wherein a first algorithm is executed to determine investor performance and provide an investor bonus and a second algorithm is executed to determine a benefit to the borrower;
memory, connected to the server system, for storing data on notes and borrower loans; and
a network connecting the investor computing device, borrower computing device, server system and memory.

11. An on-line lending system for payment dependent notes and Non-Payment Dependent Notes (NPDNs), comprising:

an electronic interface by which NPDNs are provided for investors to purchase directly from an intermediary and by which payment dependent notes are offered for purchase;

an electronic interface by which investors purchase NPDNs that earn the designated interest rate set by the intermediary;

a program by which NPDNs are held on an intermediary's platform in electronic form in a computer storage device and not listed on any securities exchange, nor in physical or paper form;

an electronic interface by which NPDN investors can access their notes using a graphical user interface including a notes tab in an investor's account;

a computerized procedure by which the intermediary will use the proceeds of NPDN purchases by investors primarily to fund borrower loans through the intermediary platform but also for general corporate purposes, including the costs of making the NPDN offering;

a computer algorithm for the sourcing and use of funding to enable the intermediary to make borrower loans via an automated online system that uses: funds from NPDN sales to investors, intermediary's direct funding account, funds from institutional capital providers, funds from intermediary's own balance sheet, and funds from accredited Investors;

a server system for use with the computerized procedure and computer algorithm and for processing data on notes, borrower loans, and investor performance, wherein an algorithm is executed to determine investor performance; and memory, connected to the server system, for storing data on notes and borrower loans.

12. The on-line lending system of claim 11 further comprising a system for investor bidding on payment dependent notes.

13. The on-line lending system of claim 11 further comprising an auto invest system for investor purchase of payment dependent notes or making a funding commitment on loans based on investor preselected criteria.

14. The on-line lending system of claim 11 wherein the electronic interface by which NPDNs are provided for purchase further comprises offering investors hybrid notes containing both NPDN and payment dependent note characteristics.

* * * * *